United States Patent
Mwanje et al.

(10) Patent No.: US 11,197,212 B2
(45) Date of Patent: Dec. 7, 2021

(54) CELL RELATIONS OPTIMIZATION

(71) Applicant: NOKIA TECHNOLOGIES OY, Espoo (FI)

(72) Inventors: Stephen Mwanje, Dorfen (DE); Janne Tapio Ali-Tolppa, Taufkirchen (DE); Muhammad Naseer-Ul-Islam, Munich (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/763,054

(22) PCT Filed: Nov. 17, 2017

(86) PCT No.: PCT/EP2017/079537
§ 371 (c)(1),
(2) Date: May 11, 2020

(87) PCT Pub. No.: WO2019/096399
PCT Pub. Date: May 23, 2019

(65) Prior Publication Data
US 2020/0351732 A1    Nov. 5, 2020

(51) Int. Cl.
*H04W 36/00*    (2009.01)
*H04W 16/14*    (2009.01)
(Continued)

(52) U.S. Cl.
CPC ....... *H04W 36/0083* (2013.01); *H04W 16/14* (2013.01); *H04W 24/02* (2013.01); *H04W 24/10* (2013.01); *H04W 36/0061* (2013.01)

(58) Field of Classification Search
CPC ..... H04W 24/02; H04W 24/10; H04W 36/08; H04W 88/08; H04W 92/20; H04W 76/15;
(Continued)

(56) References Cited

U.S. PATENT DOCUMENTS

2011/0294527 A1* 12/2011 Brueck ................. H04W 24/02
                                                         455/466
2012/0028584 A1*  2/2012 Zhang .................. H04W 16/14
                                                         455/63.1
(Continued)

OTHER PUBLICATIONS

International Search Report and Written Opinion dated Jun. 29, 2018 corresponding to International Patent Application No. PCT/EP2017/079537.
(Continued)

*Primary Examiner* — Kwasi Karikari
(74) *Attorney, Agent, or Firm* — Squire Patton Boggs (US) LLP

(57) ABSTRACT

There are provided measures for cell relations optimization. Such measures exemplarily comprise maintaining a table including a plurality of entries, each of said plurality of entries being assigned to a respective one of a plurality of neighboring cells, and each of said plurality of entries comprises overlapping amount information in relation to a source cell and said respective one of said plurality of neighboring cells and overlapping location information in relation to said source cell and said respective one of said plurality of neighboring cells, and utilizing said table for assessment of a suitability of each of said plurality of said neighboring cells for an inter-cell capability.

19 Claims, 16 Drawing Sheets

(51) Int. Cl.
*H04W 24/02* (2009.01)
*H04W 24/10* (2009.01)

(58) Field of Classification Search
CPC ............. H04W 36/0069; H04W 84/18; H04W 36/0061; H04W 36/165; H04W 8/08
See application file for complete search history.

(56) References Cited

U.S. PATENT DOCUMENTS

2012/0135771 A1* 5/2012 Futaki ................... H04L 5/0035
455/509
2017/0223586 A1* 8/2017 Cui ....................... H04L 47/125

OTHER PUBLICATIONS

Qualcomm Europe et al: "Clarifications on ANR," 3GPP Draft; R3-080988, 3GPP TSG-RAN WG3 #59bis, Jun. 23, 2008, XP050141108.

Qualcomm: "Thresholds for addition and removal of neighbour relations by the ANR function," 3GPP Draft; S5-081145, 3GPP TSG-SA5 (Telecom Management), Meeting SA5#60, Jul. 7-11, 2008, Sophia Antipolis, France, Jun. 30, 2008, XP050307750.

SA5: "LS on conditions for addition/removal of neighbour relations," 3GPP Draft; R3-081763_S5-081220, 3GPP TSG RAN WG3 Meeting #61, Jeju Island, South Korea, Aug. 18-22, 2008, Aug. 1, 2008, XP050164858.

Nokia et al: "Basic NMS backed ANR mechanism," 3GPP Draft; R3-072212, 3GPP TSG-RAN WG3 Meeting 58, Jeju, Korea, Nov. 5-9, 2007, Oct. 31, 2007, XP050162995.

* cited by examiner

CELL RELATIONS OPTIMIZATION

FIELD

The present invention relates to cell relations optimization. More specifically, the present invention exemplarily relates to measures (including methods, apparatuses and computer program products) for realizing cell relations optimization.

BACKGROUND

The present specification generally relates to management of cell associations, such as Neighbor Relations (NRs) in dense cellular environment in 4G and 5G networks. Such networks are/will be heterogeneous, and may be characterized according to the exemplary illustration of such scenario in FIG. 9.

Here, FIG. 9 is an illustration of an example Multi-layer (possibly multi-RAT (RAT: radio access technology)) Ultra Dense Network. For example, macro cells A and B might be in an older RAT (e.g. 3G) while micro cells (C, D, E) might be Long Term Evolution (LTE) and the beam forming cells (F) might be in 5G new radio.

In such network scenario, cells may be deployed in multiple network or radio layers, in particular, in network layers with at least one macro layer and one independent small cell/pico layer or radio layers with multiple radio interfaces (B6G, cm wave and/or mm wave) in a single base station/eNB.

Further, in such network scenario, the pico cells' coverage may be partially or completely overlaid by the macro cells' coverage, i.e., the macro cells may provide complete coverage which the pico cells complement with extra capacity.

Further, in such network scenario, macro cells and pico cells might be different RATs, e.g., respectively 3G, LTE/A (Long Term Evolution/Long Term Evolution Advanced) or new 5G radios.

Previously, the main use case for associating two or more cells was the creation of Neighbor Relations (NRs) for user mobility from one cell to another. These relationships were stored in a Neighbor Relationship Table (NRT) for each cell, which can also be availed over the $3^{rd}$ Generation Partnership Project (3GPP) X2 and Itf-N interfaces as may be needed. Then, for a given source cell s, the Automatic Neighbor Relations (ANR) function in LTE enables the cell s to automatically detect and add new neighbor cells using UE measurements.

ANR is a manifestation of Self-Organizing Networks (SON), a concept which refers to network management automation through self-configuration, self-optimization and self-healing. SON is implemented by SON functions, which are closed control loops automating the network management processes. They monitor the network performance via Performance Management (PM) Key Performance Indicators (KPIs) and Fault Management (FM) alarms, read the current Configuration Management (CM) data and decide on any required corrective re-configurations, which are then deployed in the network. SON functions are often divided into Distributed SON (DSON) and Centralized SON (CSON). DSON functions run in the network elements, such as for example in an eNodeB, whereas the CSON functions are implemented in the Network Management (NM) level. The latter have a broader overall view of the network, but on the other hand, the delay in collecting the input fault, configuration, accounting, performance, security (FCAPS) data and the cycle time of deploying configuration management changes can be much longer.

Currently, there is a growing number of cell procedures and SON functions, which require associations between two or more cells. Among those are:
1. Handovers for which the neighbor that maximizes session continuity (minimizes interruptions) is preferred;
2. Inter cell interference Coordination (ICIC) where a neighbor is chosen for coordinating transmission and thereby minimize interference; and
3. Energy Savings Management (ESM) where cells that adequately overlap with a given reference cell are selected for inclusion into the reference cell's Power Saving Group (PSG) within which some cells may be deactivated during periods of low traffic.

Typically, these associations require a geographical overlap between the cell coverages. However, the way the existing ANR functions and the NRT data structures are designed and standardized is intended for the mobility requirements only and often only for mobility in less dense deployments. The information required by several SON functions to determine the correct cell associations is not available via the current ANR process. As briefly illustrated by the headers of the following table (generally illustrating a structure of an LTE NR table), the LTE NRT structure provides only binary on-off values for suitability of the neighbor relationship for different use cases.

| Neighbor's Cell Id | Physical Cell Indictor | Removal allowed | Handover allowed | ICIC allowed | LB allowed | qOffset | Cell individual Offset |
|---|---|---|---|---|---|---|---|
| ... | ... | ... | ... | ... | ... | ... | ... |
| ... | ... | ... | ... | ... | ... | ... | ... |

However, for a more fine-granular optimization of several use cases, such as prioritization between possible associations, more detailed knowledge of the relationship is required.

In low density networks, it is adequate to simply state whether the process is allowed or not, since the number of candidates to which the process may be initiated is small. Owing to the density of the cells and the new use cases and functions (beyond just mobility robustness) in 5G and subsequent or similar RATs, each cell will have a very long list of candidate neighbors, and so for any one of the above processes, multiple candidate neighbors will exist. Thereby, the difference in neighbor relatedness of two candidate neighbor cells becomes a quasi-continuous function and so the degree to which the process may be allowed for a specific neighbor needs to be qualified.

ANR is unable to meet this requirement because it makes the decision of adding a NR based on the view of a single UE, yet the requirement here is a generic description of the NR quality based on the overall deployment of the cells. For example, with a long neighbor list, it is hard to optimize handover parameters in a way that avoids excessive hopping from one cell to another, i.e., a user could move from cell A to cell B and then quickly proceed to cell C. If it would be clear beforehand that the overlap with cell B is very small, the handover to B can be avoided by a small handover delay, which avoids the session interruption and associated point of failure. This is however not possible with ANR since ANR will simply add cell B to cell A's NRT as soon as any UE identifies it.

Consequently, the SON functions often need to implement their own mechanisms for determining the associations, which may include vendor-specific interfaces. For example, for Energy Saving (ES), the cells need to be assigned into Power Saving Groups (PSGs), which consist of capacity cells that can be switched off for ES reasons and the coverage cells that ensure that there is no service interruption. Furthermore, the cells need to have a correct switch-off and -on order within the PSG, so that the saved energy and service quality are optimized. For these reasons, the Energy Saving Management (ESM) functions that configure the PSGs need to have a better view on the quality of the cell overlaps than is currently provided by the ANR function and the standardized interfaces that can be used to access this information (X2, Itf-N), as described above.

Often the cell associations for SON functions are based on planning data. However, this can be difficult, if not all network layers are available in the same planning tool. Also, sometimes it is necessary to understand inter-operator adjacencies, which are hard to model due to lack of information. There is thus a need to extend the ANR functionality and the communication of neighbor relationships to DSON and CSON functions in a way that can better describe the quality of their overlap.

As mentioned above, in former RATs and corresponding network scenarios the density and degree of neighbor relations has been low and the number of SON functions requiring cell overlap information lower. In older systems (2G and 3G), cell neighbor relations were manually set and were only optimized if new NRs needed to be added or if unnecessary neighbors (those that led to handover failures) needed to be removed. In LTE, automated solutions—using the Automatic Neighbor Relations (ANR) procedure—were introduced with the aim to automatically add and/or remove neighbors. In a serving cell S, the process adds to S's NR table any cells which can be measured by UEs located in S. Any added cells are not removed unless specifically (manually) black listed e.g. for causing handover failures.

The structure of the NRT (illustrated by the table above) provides a binary field which identifies whether a specific process is allowed or not for each of the neighbors. This structure is specified by 3GPP's SA5 in the E-UTRAN Network Resource Model (NRM) as illustrated by the following table, wherein "M" means mandatory, "O" means optional, and "CM" means conditional-mandatory.

standardized interfaces that would suit the more generic use case of cell associations for different SON functions are not known.

However, according to a known attempt to automate the identification of the necessary neighbors using rules specific to each process uses the number of handovers between cells over a given period to quantify the degree to which the two cells are neighbors. The challenge here is that the handover process is itself an optimization process which already filters out some handover candidates. It is as such not appropriate for representing the (degree of) neighborliness between a pair of cells. Moreover, even handovers would themselves benefit from either an earlier process that identifies such candidates even before the users have used a cell or an optimization process that continuously assesses the (degree of) neighborliness as cells are added, adjusted or reconfigured.

According to further known attempts, the NR description among cells is enriched in terms of buckets of the nature of an overlap of respective cells. E.g., the set of NR buckets could be:

a. One cell fully encircles another cell at a different cell site.

b. For two co-located cells (same cell site), one cell fully encircles the other cell.

c. All other cells with partial overlap with one another.

Such a classification is however incomplete and tends to cluster many dissimilar NRs in a single group.

Hence, the problem arises that relationships between neighboring cells cannot be characterized in a way allowing for an automatic selection of neighboring cells suitable for a respective specific inter-cell related purpose based on the requirements defined by the purpose.

Hence, there is a need to provide for cell relations optimization.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising maintaining a

| Attribute name | Support Qualifier | isReadable | isWritable | isInvariant | isNotifyable |
|---|---|---|---|---|---|
| id | M | M | — | M | — |
| tCI | O | M | M | — | M |
| isRemoveAllowed | CM | M | M | — | M |
| isHOAllowed | CM | M | M | — | M |
| isICICInformationSend Allowed | CM | M | M | — | M |
| isLBAllowed | CM | M | M | — | M |
| isESCoveredBy | CM | M | M | — | M |
| qOffset | CM | M | M | — | M |
| cellIndividualOffset | CM | M | — | — | M |
| Attribute related to role | | | | | |
| adjacentCell | M | M | M | — | M |

Owing to the automated addition and removal of NRs, however, the length of the NRT grows to unmanageable levels in very dense networks.

Solutions for quantifying the degree of neighborliness of cells for a given cell deployment and communicating this via table including a plurality of entries, each of said plurality of entries being assigned to a respective one of a plurality of neighboring cells, and utilizing said table for assessment of a suitability of each of said plurality of said neighboring cells for an inter-cell capability, wherein each of said plurality of entries comprises overlapping amount information in relation to a source cell and said respective one of said plurality of neighboring cells and overlapping location information in relation to said source cell and said respective one of said plurality of neighboring cells.

According to an exemplary aspect of the present invention, there is provided a method comprising storing overlapping amount information in relation to a source cell and a target cell of a plurality of neighboring cells and overlapping location information in relation to said source cell and said target cell of said plurality of neighboring cells, and transmitting said overlapping amount information and said overlapping location information to at least one of said source cell and said target cell.

According to an exemplary aspect of the present invention, there is provided a method comprising computing overlapping amount information in relation to a source cell and a target cell of a plurality of neighboring cells and overlapping location information in relation to said source cell and said target cell of said plurality of neighboring cells, and storing said overlapping amount information and said overlapping location information to at least one of said source cell and said target cell.

According to an exemplary aspect of the present invention, there is provided an apparatus, the apparatus comprising at least one processor, at least one memory including computer program code, and at least one interface configured for communication with at least another apparatus, the at least one processor, with the at least one memory and the computer program code, being configured to cause the apparatus to perform maintaining a table including a plurality of entries, each of said plurality of entries being assigned to a respective one of a plurality of neighboring cells, and utilizing said table for assessment of a suitability of each of said plurality of said neighboring cells for an inter-cell capability, wherein each of said plurality of entries comprises overlapping amount information in relation to a source cell and said respective one of said plurality of neighboring cells and overlapping location information in relation to said source cell and said respective one of said plurality of neighboring cells.

According to an exemplary aspect of the present invention, there is provided an apparatus, the apparatus comprising at least one processor, at least one memory including computer program code, and at least one interface configured for communication with at least another apparatus, the at least one processor, with the at least one memory and the computer program code, being configured to cause the apparatus to perform storing overlapping amount information in relation to a source cell and a target cell of a plurality of neighboring cells and overlapping location information in relation to said source cell and said target cell of said plurality of neighboring cells, and transmitting said overlapping amount information and said overlapping location information to at least one of said source cell and said target cell.

According to an exemplary aspect of the present invention, there is provided an, the apparatus comprising at least one processor, at least one memory including computer program code, and at least one interface configured for communication with at least another apparatus, the at least one processor, with the at least one memory and the computer program code, being configured to cause the apparatus to perform computing overlapping amount information in relation to a source cell and a target cell of a plurality of neighboring cells and overlapping location information in relation to said source cell and said target cell of said plurality of neighboring cells, and storing said overlapping amount information and said overlapping location information to at least one of said source cell and said target cell.

According to an exemplary aspect of the present invention, there is provided an, the apparatus comprising maintaining circuitry configured to maintain a table including a plurality of entries, each of said plurality of entries being assigned to a respective one of a plurality of neighboring cells, and utilizing circuitry configured to utilize said table for assessment of a suitability of each of said plurality of said neighboring cells for an inter-cell capability, wherein each of said plurality of entries comprises overlapping amount information in relation to a source cell and said respective one of said plurality of neighboring cells and overlapping location information in relation to said source cell and said respective one of said plurality of neighboring cells.

According to an exemplary aspect of the present invention, there is provided an, the apparatus comprising storing circuitry configured to store overlapping amount information in relation to a source cell and a target cell of a plurality of neighboring cells and overlapping location information in relation to said source cell and said target cell of said plurality of neighboring cells, and transmitting circuitry configured to transmit said overlapping amount information and said overlapping location information to at least one of said source cell and said target cell.

According to an exemplary aspect of the present invention, there is provided an, the apparatus comprising computing circuitry configured to compute overlapping amount information in relation to a source cell and a target cell of a plurality of neighboring cells and overlapping location information in relation to said source cell and said target cell of said plurality of neighboring cells, and storing circuitry configured to store said overlapping amount information and said overlapping location information to at least one of said source cell and said target cell.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient determination of an inter-cell relationship and a selection of suitable cells for a specific purpose based on the inter-cell relationship and the requirements defined by the purpose to thereby solve at least part of the problems and drawbacks identified in relation to the prior art.

By way of exemplary embodiments of the present invention, there is provided cell relations optimization. More specifically, by way of exemplary embodiments of the present invention, there are provided measures and mechanisms for realizing cell relations optimization.

Thus, improvement is achieved by methods, apparatuses and computer program products enabling/realizing cell relations optimization.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

Figure 1:
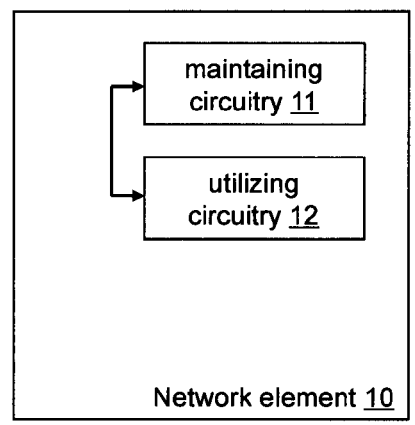
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) cell relations optimization.

As mentioned above, for a more fine-granular optimization of several use cases, such as prioritization between possible associations, more detailed knowledge of the relationship is required. The needed additional information may, for example, include the role of the cells in the neighbor relationship (macro/pico etc.), the amount of overlap in each direction and the location of the overlap relative to the cell location and azimuth.

There is thus a need to extend the ANR functionality and the communication of neighbor relationships to DSON and CSON functions in a way that can better describe the quality of their overlap.

This requirement, for each of the processes, can be captured in terms of the threshold of the degree of neighborliness and the location where that overlap occurs. The quantification of neighborliness must:

1. be consistent across all neighbor cell characteristics like sizes (macro, pico, etc.), shape (omni, sectored, etc.) or type (urban, rural, etc.); and must
2. use simple intuitive metrics, which can be easily communicated over the open interfaces.

Exemplary embodiments of the present invention considered disadvantages of clustering many dissimilar NRs in a single group by incomplete classifications by means of a bucked based approach outlined above. In particular, the present invention started out from the idea that it would be best if the NRs are characterized by a continuous variable for which different thresholds may be used for different processes/purposes.

Thus, in general, according to exemplary embodiments of the present invention, the NRT is extended with two fields that abstract the properties of the quality of the cell overlap and respectively identify the expected degree of neighborliness between the serving cell and each target cell hereinafter called the Cell Proximity Coupling (CPC) or overlapping amount information (i.e. "cell-overlap-amount information" being information on an amount of overlap between a source cell and one of plurality of neighboring cells), and the location of the overlap with respect to the source cell, which is modeled as the center of mass of the overlapping area (analogous to the center of mass of objects in physics), and is hereafter called the CPC Center of Mass (CoM) or overlapping location information (i.e. "cell-overlap-location information" being information on a location of the overlap).

Further, in general, according to exemplary embodiments of the present invention, the respective interfaces through which NRs are exchanged in the network are extended.

Still further, in general, according to exemplary embodiments of the present invention, measures for computing the Cell Proximity Coupling (CPC) and the CPC Center of Mass (CoM) are provided.

Figure 10:
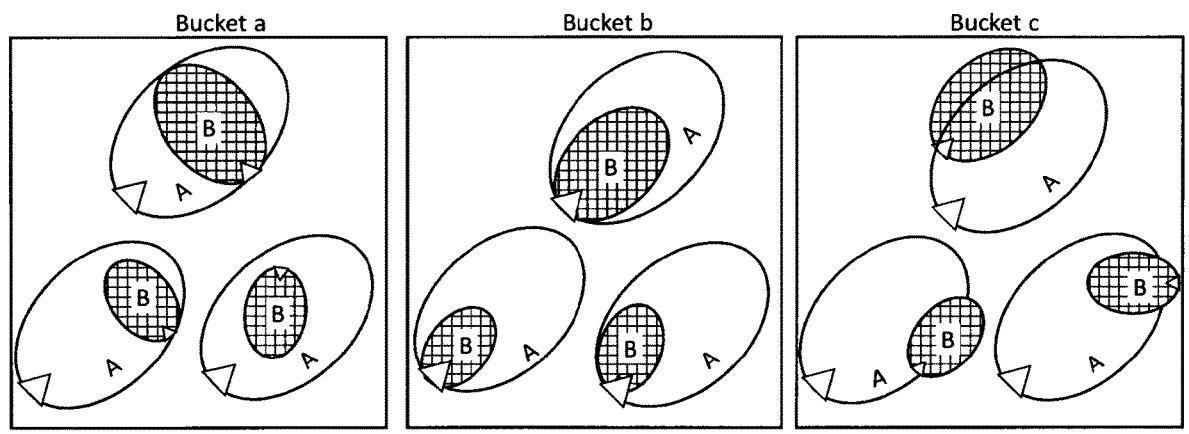
FIG. 10 is a schematic diagram illustrating a differentiation of neighborliness using a bucket based concept.

The CPC (or overlapping amount information) provides a continuous variable for which different thresholds and constraints may be applied for different purposes as needed. This enriches the NR descriptions beyond just the bucket grouping outlined above. That is, the same buckets can be achievable (as shown in FIG. 10 and in the table below for a macro cell A against another cell B). In addition thereto, further subgroupings can be established (as shown in the table below for a macro cell A against another cell B) which would otherwise be impossible using the bucket procedure.

Figure 6:
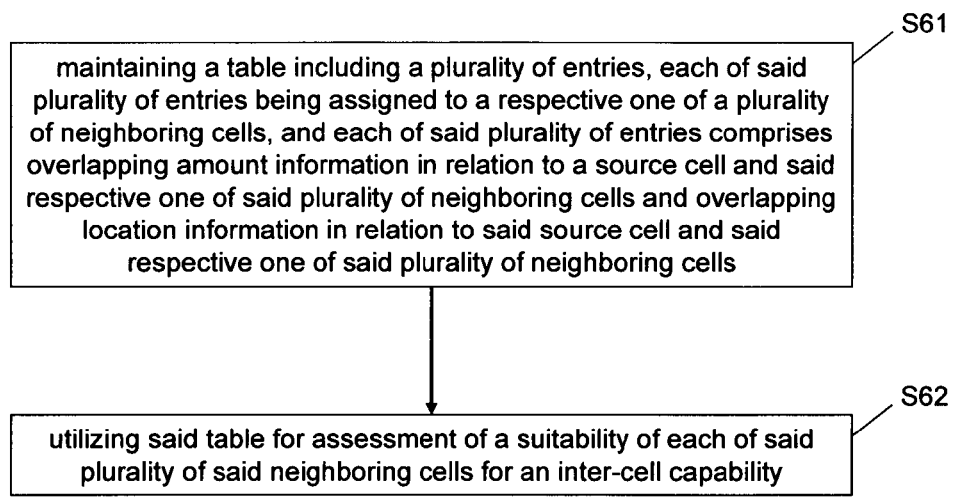
FIG. 6 is a schematic diagram of a procedure according to exemplary embodiments of the present invention.

Here, FIG. 10 is a schematic diagram illustrating a differentiation of neighborliness using a bucket based concept, and in particular illustrates a differentiation of neighborliness using the bucket and CPC concepts according to exemplary embodiments of the present invention. While the buckets generalize multiple different overlap scenarios as one, the CPC concept according to exemplary embodiments of the present invention easily differentiates the scenarios within each group (see table below, illustrating example descriptions of overlap buckets using CPC).

connection with a cell (i.e. may be a base station or an access node of a cellular system) comprising a maintaining circuitry 11 and a utilizing circuitry 12. The maintaining circuitry 11 maintains a table including a plurality of entries, each of said plurality of entries being assigned to a respective one of a plurality of neighboring cells. The utilizing circuitry 12 utilizes said table for assessment of a suitability of each of said plurality of said neighboring cells for an inter-cell capability. Each of said plurality of entries comprises overlapping amount information in relation to a source cell and said respective one of said plurality of neighboring cells and overlapping location information in relation to said source cell and said respective one of said plurality of neighboring cells. FIG. 6 is a schematic diagram of a procedure according to exemplary embodiments of the present invention. The apparatus according to FIG. 1 may perform the method of FIG. 6 but is not limited to this method. The method of FIG. 6 may be performed by the apparatus of FIG. 1 but is not limited to being performed by this apparatus.

As shown in FIG. 6, a procedure according to exemplary embodiments of the present invention comprises an operation of maintaining (S61) a table including a plurality of entries, each of said plurality of entries being assigned to a

| Bucket | CPC threshold | Extra constraint | Extra sub-groupings |
|---|---|---|---|
| a | $CPC_{AB} < 100$; $CPC_{BA} = 100$ | Cells not co-located | 1. Encircled Pico cell (e.g. $CPC_{AB} < 20\%$; $CPC_{BA} = 100\%$) 2. Encircled Micro cell (e.g. $20\% < CPC_{AB} < 60\%$; $CPC_{BA} = 100\%$) |
| b | $CPC_{AB} < 100$; $CPC_{BA} = 100$ | Cells co-located | 1. Co-located Micro cell (e.g. $20\% < CPCAB < 60\%$; $CPCBA = 100\%$) 2. Co-located Macro cell (e.g. $CPCAB > 609\%$; $CPCBA = 100\%$) |
| c | $0 < CPC_{AB} < 100$; $0 < CPC_{BA} < 100$ | None | 1. High overlap Micro cell (e.g. $20\% < CPC_{AB} < 59\%$; $CPC_{BA} \geq Thm$; $Thm < 100\%$) |

$CPC_{AB}$—CPC measured in A describing how much cell B overlaps with cell A

That is, according to exemplary embodiments of the present invention, core of the invention is the CPC and its center of mass are introduced and defined. The CPC (i.e. overlapping amount information) is a measure of the degree of neighborliness between any two cells, which meets the requirements that between a serving cell S and its target neighbors the CPC is consistent across all neighbor cell characteristics like sizes (macro, pico, etc.), shape (omni, sectored, etc.) or type (urban, rural, etc.), and the CPC uses simple intuitive metrics and two scalar variables to describe the quality of the overlap in a way that can easily be communicated over defined interfaces.

According to exemplary embodiments of the present invention, the CPC may be used by both centralized and distributed SON functions to, for example, optimize the list of neighbors to which handovers are allowed or those with whom transmissions have to be coordinated to minimize interference.

Correspondingly, according to exemplary embodiments of the present invention the computation of the CPC (and CoM) may be implemented centrally or may be implemented in a distributed form. In the latter case, each cell's NRT needs to be updated with the computed values for each NR.

FIG. 1 is a block diagram illustrating an apparatus according to exemplary embodiments of the present invention. The apparatus may be a network element 10 implementing or in respective one of a plurality of neighboring cells, and an operation of utilizing (S62) said table for assessment of a suitability of each of said plurality of said neighboring cells for an inter-cell capability. According to such procedure, each of said plurality of entries comprises overlapping amount information in relation to a source cell and said respective one of said plurality of neighboring cells and overlapping location information in relation to said source cell and said respective one of said plurality of neighboring cells.

Figure 2:
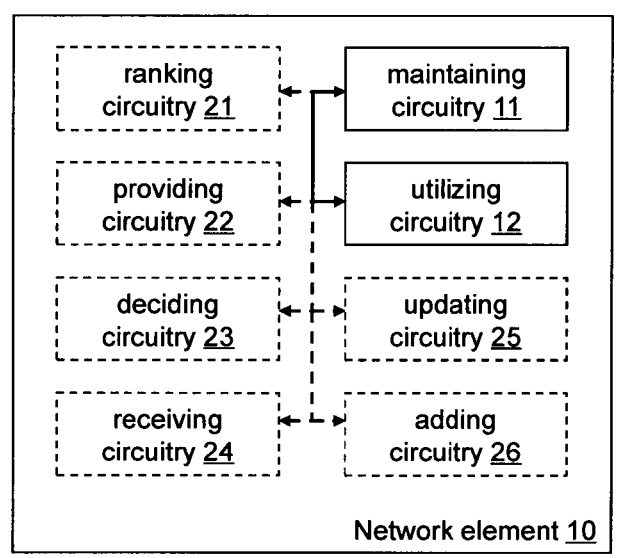
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise ranking circuitry 21, providing circuitry 22, deciding circuitry 23, receiving circuitry 24, updating circuitry 25, and/or adding circuitry 26.

In an embodiment at least some of the functionalities of the apparatus shown in FIG. 1 (or 2) may be shared between two (or more) physically separate devices forming one operational entity. Therefore, the apparatus may be seen to depict the operational entity comprising one or more physically separate devices for executing at least some of the described processes.

According to a variation of the procedure shown in FIG. 6, exemplary details of the utilizing operation (S62) are given, which are inherently independent from each other as such.

Such exemplary utilizing operation (S62) according to exemplary embodiments of the present invention may comprise an operation of ranking said plurality of neighboring cells based on at least one of said respective overlapping amount information and said respective overlapping location information.

According to a variation of the procedure shown in FIG. 6, exemplary details of the utilizing operation (S62) are given, which are inherently independent from each other as such.

Such exemplary utilizing operation (S62) according to exemplary embodiments of the present invention may comprise an operation of providing said table to a distributed self-organizing networks function.

Alternatively, such exemplary utilizing operation (S62) according to exemplary embodiments of the present invention may comprise an operation of providing said table to a centralized self-organizing networks function.

According to a variation of the procedure shown in FIG. 6, exemplary details of the utilizing operation (S62) are given, which are inherently independent from each other as such.

Such exemplary utilizing operation (S62) according to exemplary embodiments of the present invention may comprise an operation of deciding said suitability of each of said plurality of said neighboring cells for an inter-cell capability based on a comparison of at least one of said respective overlapping amount information and said respective overlapping location information with at least one threshold value associated with said inter-cell capability and/or at least one value range associated with said inter-cell capability.

According to further exemplary embodiments of the present invention, said overlapping amount information is indicative of a portion of a geographical coverage of said source cell which is overlapped with a geographical coverage of said respective one of said plurality of neighboring cells.

According to further exemplary embodiments of the present invention, said overlapping location information is indicative of a positional relationship between said source cell and a center of mass of a region of overlap of said source cell and said respective one of said plurality of neighboring cells.

According to further exemplary embodiments of the present invention, said overlapping amount information corresponds to a value in a predetermined range of 0 to 100. Here, it is noted that the range of 0 to 100 is a non-limiting example for the predetermined range, and alternative ranges may be implemented as well. For example, the predetermined range may be a range of decimal numbers between 0 and 1, or may be a range between two arbitrary boundary points including values in regular or irregular intervals.

According to still further exemplary embodiments of the present invention, said overlapping location information includes a distance corresponding to a combination of a distance value in a predetermined range of 0 to 100 indicative of a distance between said source cell and said center of mass of said region of overlap of said source cell and said respective one of said plurality of neighboring cells and of an angle value in a predetermined range of −180 to +180 indicative of an angle between a reference direction of said source cell and a direction from said source cell to said center of mass of said region of overlap of said source cell and said respective one of said plurality of neighboring cells. Here, it is noted that the range of 0 to 100 is a non-limiting example for the predetermined range, and alternative ranges may be implemented as well. For example, the predetermined range may be a range of decimal numbers between 0 and 1, or may be a range between two arbitrary boundary points including values in regular or irregular intervals. Further, also the predetermined range of −180 to +180 is a non-limiting example and may be any range suitable for representing the corresponding angular sector.

According to a variation of the procedure shown in FIG. 6, exemplary additional operations are given, which are inherently independent from each other as such. According to such variation, an exemplary method according to exemplary embodiments of the present invention may comprise an operation of receiving overlapping amount information in relation to said source cell and a target cell of said plurality of neighboring cells and overlapping location information in relation to said source cell and said target cell of said plurality of neighboring cells, and an operation of updating, in said table, said entry assigned to said target cell using said received overlapping amount information and said received overlapping location information, or of adding, to said table, an entry assigned to said target cell using said received overlapping amount information and said received overlapping location information.

According to still further exemplary embodiments of the present invention, said overlapping amount information in relation to said source cell and said target cell of said plurality of neighboring cells and said overlapping location information in relation to said source cell and said target cell of said plurality of neighboring cells are received using an X2 interface.

According to still further exemplary embodiments of the present invention, said overlapping amount information in relation to said source cell and said target cell of said plurality of neighboring cells and said overlapping location information in relation to said source cell and said target cell of said plurality of neighboring cells are received as respective fields in an X2 interface X2 SETUP REQUEST message.

According to still further exemplary embodiments of the present invention, said overlapping amount information in relation to said source cell and said target cell of said plurality of neighboring cells and said overlapping location information in relation to said source cell and said target cell of said plurality of neighboring cells are received using an Itf-N interface.

According to still further exemplary embodiments of the present invention, said overlapping amount information in relation to said source cell and said target cell of said plurality of neighboring cells and said overlapping location information in relation to said source cell and said target cell of said plurality of neighboring cells are received as respective fields in an Itf-N basic configuration management integration reference point operations message and/or a bulk configuration management integration reference point operations message.

According to still further exemplary embodiments of the present invention, said respective overlapping amount information is calculated based on the equation $$CPC = \frac{100 \times \min[-d + R_s \cdot cp_s \cdot cp_{sy} + R_t \cdot cp_t \cdot cp_{ty}; 2R_t; 2R_s]}{2R_s}$$

wherein CPC is the respective overlapping amount information, d is a distance between said source cell and said respective one of said plurality of neighboring cells, $R_s$ is a maximum coverage distance of said source cell, $R_t$ is a maximum coverage distance of said respective one of said plurality of neighboring cells, $cp_s$ and $cp_t$ are line of sight coefficients related to said source cell and said respective one of said plurality of neighboring cells, and $cp_{sy}$ and $cp_{ty}$ are orthogonal coefficients related to said source cell and said respective one of said plurality of neighboring cells.

It is noted that the calculation of CPC as defined above is a non-limiting example for a determination of the respective overlapping amount information.

According to still further exemplary embodiments of the present invention, said respective overlapping location information is calculated based on the equations for non co-located cells $$r_s = R_s \cdot cp_s \cdot cp_{sy} - R_s \cdot \frac{CPC_s}{2}$$

$$\gamma_s = \theta_{st} - \cos^{-1}\left[\frac{d^2 + r_s^2 - r_t^2}{2 \cdot d \cdot r_s}\right]$$

and for co-located cells $$r_s = \frac{R_s}{2} \left|\cos\left(\frac{\gamma_s}{2}\right)\right|^{\tau_s}$$

wherein $r_s$ is a distance value of said respective overlapping location information, $\gamma_s$ is an angle value of said respective overlapping location information, $R_s$ is a maximum coverage distance of said source cell, $cp_s$ is a line of sight coefficient related to said source cell and said respective one of said plurality of neighboring cells, $cp_{sy}$ is an orthogonal coefficient related to said source cell and said respective one of said plurality of neighboring cells, $CPC_s$ is said respective overlapping amount information, $\theta_{st}$ is an angle between a direction of said maximum coverage distance of said source cell and a direction between said source cell and said respective one of said plurality of neighboring cells, d is a distance between said source cell and said respective one of said plurality of neighboring cells, $r_t$ corresponds to a distance value of overlapping location information for said respective one of said plurality of neighboring cells, and $\tau_s$ is a heuristic beam width factor to account for how much for a given distance a received signal changes as a function of an antenna's beam width.

According to still further exemplary embodiments of the present invention, said inter-cell capability is one of a handover of a mobile terminal, an inter cell interference coordination, an energy savings mechanism, and a physical cell identities (PCI) assignment.

In addition, there are other more recent capabilities (and possibly future ones) which may benefit from the invention. As an example, is multi-point transmission which allows two cells to simultaneously serve a given user benefits from such exemplary embodiments of the present invention and in particular from the degree of overlap between the cells as well.

Figure 3:
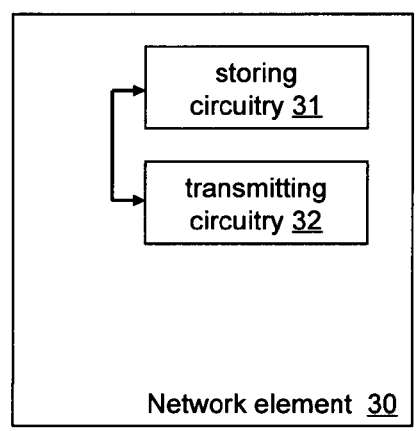
FIG. 3 is a block diagram illustrating an apparatus according to exemplary embodiments of the present invention.
Figure 7:
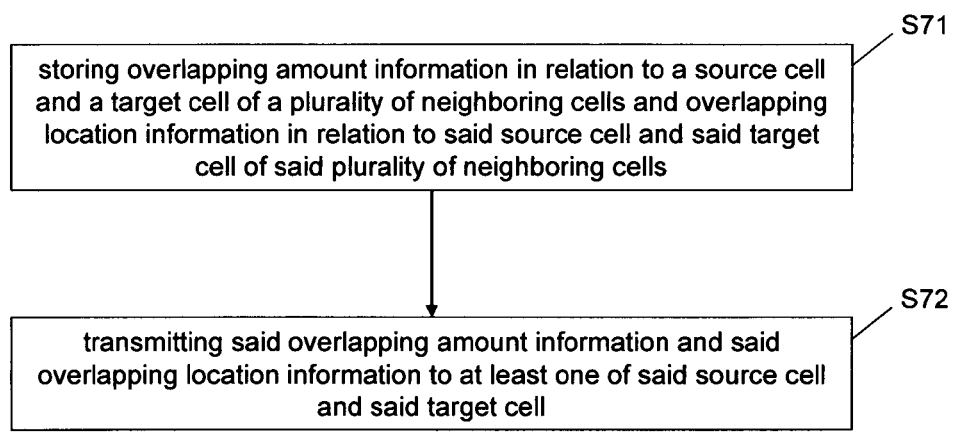
FIG. 7 is a schematic diagram of a procedure according to exemplary embodiments of the present invention.

FIG. 3 is a block diagram illustrating an apparatus according to exemplary embodiments of the present invention. The apparatus may be a network element 30 implementing or in connection with or managing a cell (i.e. may be an operations-administration-and-management (OAM) network entity allocated to a cellular system) comprising a storing circuitry 31 and a transmitting circuitry 32. The storing circuitry 31 stores overlapping amount information in relation to a source cell and a target cell of a plurality of neighboring cells and overlapping location information in relation to said source cell and said target cell of said plurality of neighboring cells. The transmitting circuitry 32 transmits said overlapping amount information and said overlapping location information to at least one of said source cell and said target cell. FIG. 7 is a schematic diagram of a procedure according to exemplary embodiments of the present invention. The apparatus according to FIG. 3 may perform the method of FIG. 7 but is not limited to this method. The method of FIG. 7 may be performed by the apparatus of FIG. 3 but is not limited to being performed by this apparatus.

As shown in FIG. 7, a procedure according to exemplary embodiments of the present invention comprises an operation of storing (S71) overlapping amount information in relation to a source cell and a target cell of a plurality of neighboring cells and overlapping location information in relation to said source cell and said target cell of said plurality of neighboring cells, and an operation of transmitting (S72) said overlapping amount information and said overlapping location information to at least one of said source cell and said target cell.

Figure 4:
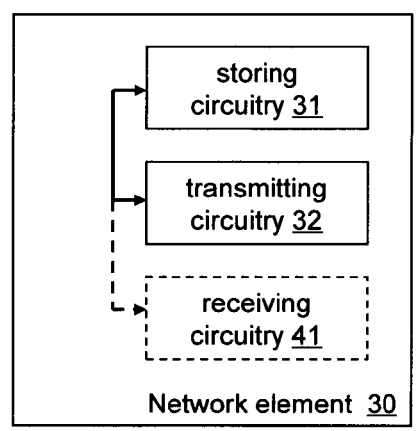
FIG. 4 is a block diagram illustrating an apparatus according to exemplary embodiments of the present invention.

FIG. 4 is a block diagram illustrating an apparatus according to exemplary embodiments of the present invention. In particular, FIG. 4 illustrates a variation of the apparatus shown in FIG. 3. The apparatus according to FIG. 4 may thus further comprise receiving circuitry 41.

In an embodiment at least some of the functionalities of the apparatus shown in FIG. 3 (or 4) may be shared between two (or more) physically separate devices forming one operational entity. Therefore, the apparatus may be seen to depict the operational entity comprising one or more physically separate devices for executing at least some of the described processes.

According to a variation of the procedure shown in FIG. 3, exemplary additional operations are given, which are inherently independent from each other as such. According to such variation, an exemplary method according to exemplary embodiments of the present invention may comprise an operation of receiving, from said source cell or said target cell, a request to transmit said overlapping amount information and said overlapping location information to said respective one of said source cell and said target cell.

According to further exemplary embodiments of the present invention, said overlapping amount information in relation to said source cell and said target cell of said plurality of neighboring cells and said overlapping location information in relation to said source cell and said target cell of said plurality of neighboring cells are transmitted using an X2 interface.

According to further exemplary embodiments of the present invention, said overlapping amount information in relation to said source cell and said target cell of said plurality of neighboring cells and said overlapping location information in relation to said source cell and said target cell of said plurality of neighboring cells are transmitted as respective fields in an X2 interface X2 SETUP REQUEST message.

According to further exemplary embodiments of the present invention, said overlapping amount information in relation to said source cell and said target cell of said plurality of neighboring cells and said overlapping location information in relation to said source cell and said target cell of said plurality of neighboring cells are transmitted using an Itf-N interface.

According to further exemplary embodiments of the present invention, said overlapping amount information in relation to said source cell and said target cell of said plurality of neighboring cells and said overlapping location information in relation to said source cell and said target cell of said plurality of neighboring cells are transmitted as respective fields in an Itf-N basic configuration management integration reference point operations message and/or a bulk configuration management integration reference point operations message.

According to still further exemplary embodiments of the present invention, said overlapping amount information in relation to said source cell and said target cell of said plurality of neighboring cells is indicative of a portion of a geographical coverage of said source cell which is overlapped with a geographical coverage of said target cell of said plurality of neighboring cells.

According to still further exemplary embodiments of the present invention, said overlapping location information in relation to said source cell and said target cell of said plurality of neighboring cells is indicative of a positional relationship between said source cell and a center of mass of a region of overlap of said source cell and said target cell of said plurality of neighboring cells.

According to still further exemplary embodiments of the present invention, said overlapping amount information corresponds to a value in a predetermined range of 0 to 100.

According to still further exemplary embodiments of the present invention, said overlapping location information includes a distance corresponding to a combination of a distance value in a predetermined range of 0 to 100 indicative of a distance between said source cell and said center of mass of said region of overlap of said source cell and said target cell of said plurality of neighboring cells and of an angle value in a predetermined range of −180 to +180 indicative of an angle between a reference direction of said source cell and a direction from said source cell to said center of mass of said region of overlap of said source cell and said target cell of said plurality of neighboring cells.

As already discussed above, the predetermined ranges mentioned for the exemplary embodiments of the present invention are non-limiting examples, and may be set to different ranges for example based on the need of subsequent calculation or transmission processes.

According to still further exemplary embodiments of the present invention, said overlapping amount information is calculated based on the equation $$CPC = \frac{100 \times \min[-d + R_s \cdot cp_s \cdot cp_{sy} + R_t \cdot cp_t \cdot cp_{ty}; 2R_t; 2R_s]}{2R_s}$$

wherein CPC is the respective overlapping amount information, d is a distance between said source cell and said target cell of said plurality of neighboring cells, $R_s$ is a maximum coverage distance of said source cell, $R_t$ is a maximum coverage distance of said target cell of said plurality of neighboring cells, $cp_s$ and $cp_t$ are line of sight coefficients related to said source cell and said target cell of said plurality of neighboring cells, and $cp_{sy}$ and $cp_{ty}$ are orthogonal coefficients related to said source cell and said target cell of said plurality of neighboring cells.

As noted in the foregoing, the calculation of CPC as defined above is a non-limiting example for a determination of the respective overlapping amount information.

According to still further exemplary embodiments of the present invention, said overlapping location information is calculated based on the equations
for non co-located cells $$r_s = R_s \cdot cp_s \cdot cp_{sy} - R_s \cdot \frac{CPC_s}{2}$$

$$\gamma_s = \theta_{st} - \cos^{-1}\left[\frac{d^2 + r_s^2 - r_t^2}{2 \cdot d \cdot r_s}\right]$$

and for co-located cells $$r_s = \frac{R_s}{2} \left|\cos\left(\frac{\gamma_s}{2}\right)\right|^{\tau_s}$$

wherein $r_s$ is a distance value of said respective overlapping location information, $\gamma_s$ is an angle value of said respective overlapping location information, $R_s$ is a maximum coverage distance of said source cell, $cp_s$ is a line of sight coefficient related to said source cell and said target cell of said plurality of neighboring cells, $cp_{sy}$ is an orthogonal coefficient related to said source cell and said target cell of said plurality of neighboring cells, CPC is said respective overlapping amount information, $\theta_{st}$ is an angle between a direction of said maximum coverage distance of said source cell and a direction between said source cell and said target cell of said plurality of neighboring cells, d is a distance between said source cell and said target cell of said plurality of neighboring cells, $r_t$ corresponds to a distance value of overlapping location information for said target cell of said plurality of neighboring cells, and $\tau_s$ is a heuristic beam width factor to account for how much for a given distance a received signal changes as a function of an antenna's beam width.

Figure 5:
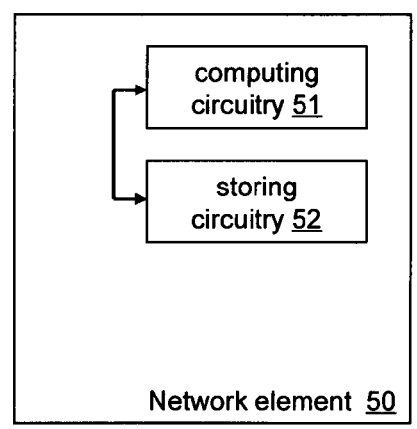
FIG. 5 is a block diagram illustrating an apparatus according to exemplary embodiments of the present invention.
Figure 8:
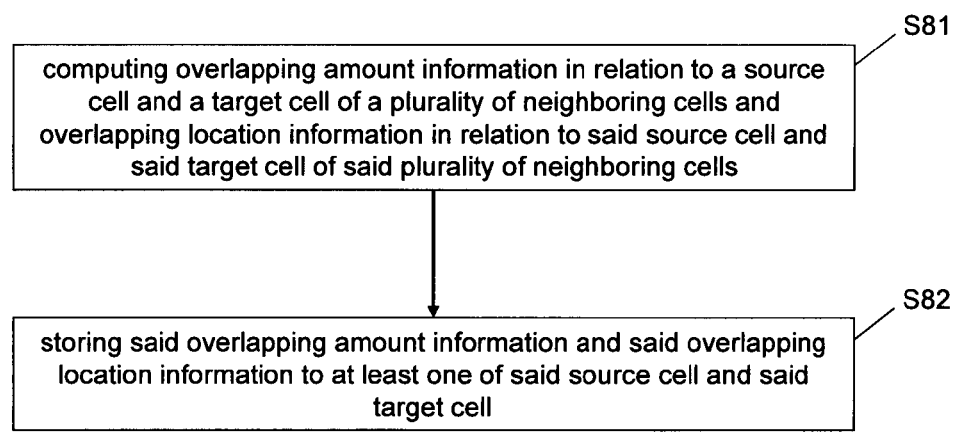
FIG. 8 is a schematic diagram of a procedure according to exemplary embodiments of the present invention.
Figure 9:
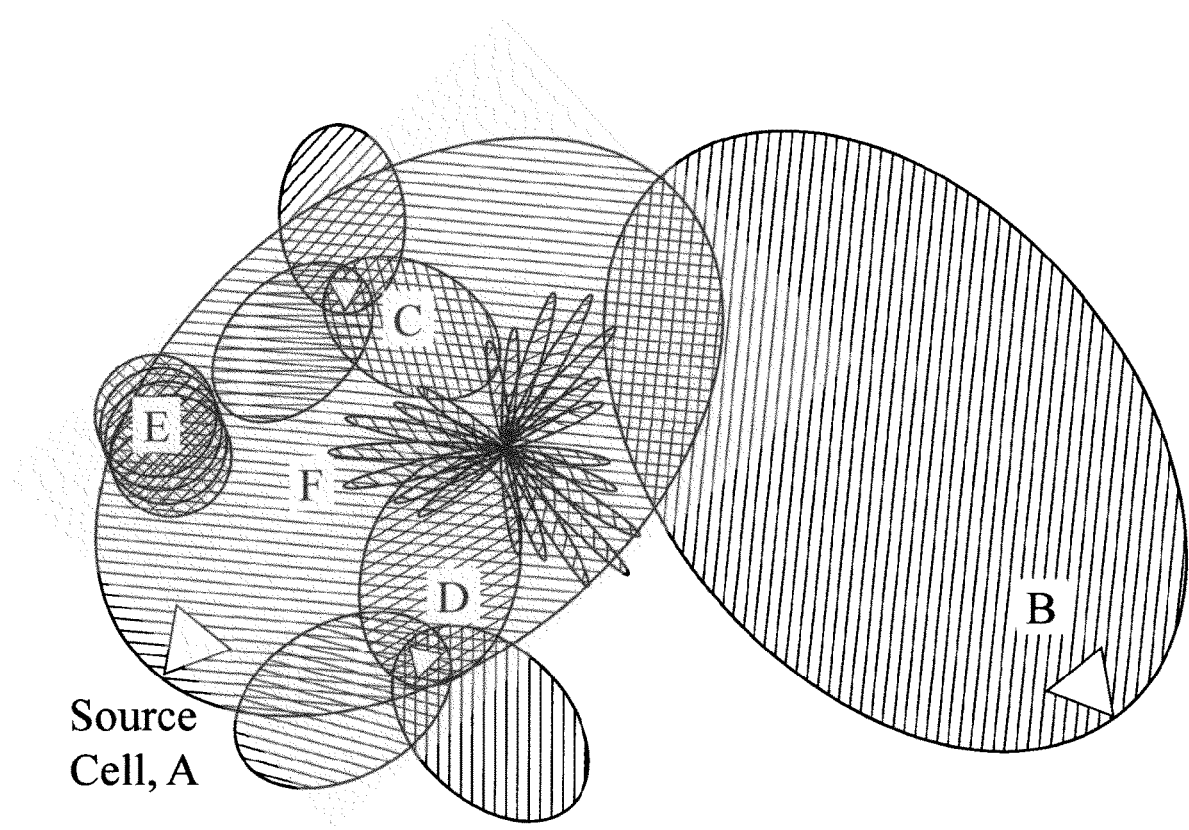
FIG. 9 is a schematic diagram illustrating an exemplary scenario of multiple overlapping cells of multiple radio access technologies.

FIG. 5 is a block diagram illustrating an apparatus according to exemplary embodiments of the present invention. The apparatus may be a network element 50 implementing or in connection with or managing a cell (i.e. may be a base station or an access node of a cellular system or may be an operations-administration-and-management network entity allocated to the cellular system) comprising a computing circuitry 51 and a storing circuitry 52. The computing circuitry 51 computes overlapping amount information in relation to a source cell and a target cell of a plurality of neighboring cells and overlapping location information in relation to said source cell and said target cell of said plurality of neighboring cells. The storing circuitry 52 stores said overlapping amount information and said overlapping location information to at least one of said source cell and said target cell. FIG. 8 is a schematic diagram of a procedure according to exemplary embodiments of the present invention. The apparatus according to FIG. 5 may perform the method of FIG. 8 but is not limited to this method. The method of FIG. 8 may be performed by the apparatus of FIG. 5 but is not limited to being performed by this apparatus.

As shown in FIG. 8, a procedure according to exemplary embodiments of the present invention comprises an operation of computing (S81) overlapping amount information in relation to a source cell and a target cell of a plurality of neighboring cells and overlapping location information in relation to said source cell and said target cell of said plurality of neighboring cells, and an operation of storing (S82) said overlapping amount information and said overlapping location information to at least one of said source cell and said target cell.

In an embodiment at least some of the functionalities of the apparatus shown in FIG. 5 may be shared between two (or more) physically separate devices forming one operational entity. Therefore, the apparatus may be seen to depict the operational entity comprising one or more physically separate devices for executing at least some of the described processes.

According to further exemplary embodiments of the present invention, said overlapping amount information is computed based on at least one of a distance between said source cell and said respective one of said plurality of neighboring cells, a maximum coverage distance of said source cell, a maximum coverage distance of said respective one of said plurality of neighboring cells, line of sight coefficients related to said source cell and said respective one of said plurality of neighboring cells, and orthogonal coefficients related to said source cell and said respective one of said plurality of neighboring cells.

According to further exemplary embodiments of the present invention, said overlapping location information is computed based on at least one of a distance value of said respective overlapping location information, an angle value of said respective overlapping location information, a maximum coverage distance of said source cell, a line of sight coefficient related to said source cell and said target cell of said plurality of neighboring cells, an orthogonal coefficient related to said source cell and said target cell of said plurality of neighboring cells, said overlapping amount information, an angle between a direction of said maximum coverage distance of said source cell and a direction between said source cell and said target cell of said plurality of neighboring cells, a distance between said source cell and said target cell of said plurality of neighboring cells, a distance value of overlapping location information for said target cell of said plurality of neighboring cells, and a heuristic beam width factor to account for how much for a given distance a received signal changes as a function of an antenna's beam width.

According to still further exemplary embodiments of the present invention, said overlapping amount information is calculated based on the equation $$CPC = \frac{100 \times \min[-d + R_s \cdot cp_s \cdot cp_{sy} + R_t \cdot cp_t \cdot cp_{ty}; 2R_t; 2R_s]}{2R_s}$$

wherein CPC is the respective overlapping amount information, d is said distance between said source cell and said target cell of said plurality of neighboring cells, $R_s$ is said maximum coverage distance of said source cell, $R_t$ is said maximum coverage distance of said target cell of said plurality of neighboring cells, $cp_s$ and $cp_t$ are said line of sight coefficients related to said source cell and said target cell of said plurality of neighboring cells, and $cp_{sy}$ and $cp_{ty}$ are said orthogonal coefficients related to said source cell and said target cell of said plurality of neighboring cells.

As noted in the foregoing, the calculation of CPC as defined above is a non-limiting example for a determination of the respective overlapping amount information.

According to still further exemplary embodiments of the present invention, said overlapping location information is calculated based on the equations for non co-located cells $$r_s = R_s \cdot cp_s \cdot cp_{sy} - R_s \cdot \frac{CPC_s}{2}$$

$$\gamma_s = \theta_{st} - \cos^{-1}\left[\frac{d^2 + r_s^2 - r_t^2}{2 \cdot d \cdot r_s}\right]$$

and for co-located cells $$r_s = \frac{R_s}{2} \left| \cos\left(\frac{\gamma_s}{2}\right) \right|^{\tau_s}$$

wherein $r_s$ is said distance value of said respective overlapping location information, $\gamma_s$ is said angle value of said respective overlapping location information, $R_s$ is said maximum coverage distance of said source cell, $cp_s$ is said line of sight coefficient related to said source cell and said target cell of said plurality of neighboring cells, $cp_{sy}$ is said orthogonal coefficient related to said source cell and said target cell of said plurality of neighboring cells, $CPC_s$ is said respective overlapping amount information, $\theta_{st}$ is said angle between a direction of said maximum coverage distance of said source cell and a direction between said source cell and said target cell of said plurality of neighboring cells, d is said distance between said source cell and said target cell of said plurality of neighboring cells, $r_t$ corresponds to said distance value of overlapping location information for said target cell of said plurality of neighboring cells, and $\tau_s$ is said heuristic beam width factor to account for how much for a given distance a received signal changes as a function of an antenna's beam width.

According to still further exemplary embodiments of the present invention, said overlapping amount information is indicative of a portion of a geographical coverage of said source cell which is overlapped with a geographical coverage of said target cell of said plurality of neighboring cells.

According to still further exemplary embodiments of the present invention, said overlapping location information is indicative of a positional relationship between said source cell and a center of mass of a region of overlap of said source cell and said target cell of said plurality of neighboring cells.

According to still further exemplary embodiments of the present invention, said overlapping amount information corresponds to a value in a predetermined range of 0 to 100.

According to still further exemplary embodiments of the present invention, said overlapping location information includes a distance corresponding to a combination of a distance value in a predetermined range of 0 to 100 indicative of a distance between said source cell and said center of mass of said region of overlap of said source cell and said target cell of said plurality of neighboring cells and of an angle value in a predetermined range of −180 to +180 indicative of an angle between a reference direction of said source cell and a direction from said source cell to said center of mass of said region of overlap of said source cell and said target cell of said plurality of neighboring cells.

As already discussed above, the predetermined ranges mentioned for the exemplary embodiments of the present invention are non-limiting examples, and may be set to different ranges for example based on the need of subsequent calculation or transmission processes.

The above specified exemplary embodiments of the present invention are subsequently described in more detail.

Extended NRT and Interfaces:

According to exemplary embodiments of the present invention, the NRT is extended by adding a field for the CPC and a field for the (CPC) CoM as shown in the NRT illustration in the table below. The degree of neighborliness/overlap is expected to be between 0% the case where there is no overlap at all between the two cells and 100% in the case where the target cell completely overlaps the source cell (i.e. in this case the coverage area of the source cell is completely contained within the coverage area of the target cell, but not necessarily vice versa).

As such, according to exemplary embodiments of the present invention, the CPC is indicated as integer values in the range [0,100]. In line with the above discussion, alternative indications such as for example "(0-1)" or similar are applicable as well.

For a pair of cells (s,t), two CPC values can be defined, each representing the overlap of one cell over the other. Here, for a source cell s, since most the processes will be evaluated in the source against multiple target cells, the CPC tracked in the NRT, ($CPC_{s,t}$), is the degree to which the target cell's coverage overlaps the source cell's coverage, i.e. it defines how much of the source cell's coverage is also covered by the target cell. However, where required, according to exemplary embodiments of the present invention, the reverse value (i.e. $CPC_{t,s}$) may be requested from the target cell through X2 interface or from the network manager through interface N (Itf-N).

Since the center of mass (COM, i.e. overlapping location information) is dependent on the specific antenna configurations, it is identified by the distance from the antenna site and the angle relative to the antenna boresight.

As such, according to exemplary embodiments of the present invention, the CoM is indicated as tuple $[r_s, \gamma_s]$ of integer values with $r_s$ in the range [0,100] for the distance as a ratio of the cell range (i.e., distance to the CoM relative to the cell range) and $\gamma_s$ in the range [−180,180] for the angle.

According to exemplary embodiments of the present invention, the above discussed table generally illustrating a structure of an LTE NR table may be extended by two further columns representing the CPC and the CPC CoM, as shown below.

```
< X2 SETUP REQUEST >
 ... ... ...
    Neighbour-Information ::= SEQUENCE (SIZE
       (0..maxnoofNeighbours)) OF SEQUENCE {
       eCGI ECGI,
       pCI PCI,
       eARFCN EARFCN,
       iE-Extensions ProtocolExtensionContainer { {Neighbour-
          Information-ExtIEs}
       {cPC CPC},
       {coM CoM}
       } OPTIONAL,
    ...
```

That is, in line with exemplary embodiments of the present invention, the Neighbor-Information IE is extended by the entries "{cPC CPC}" and "{coM CoM}".

Figure 11:
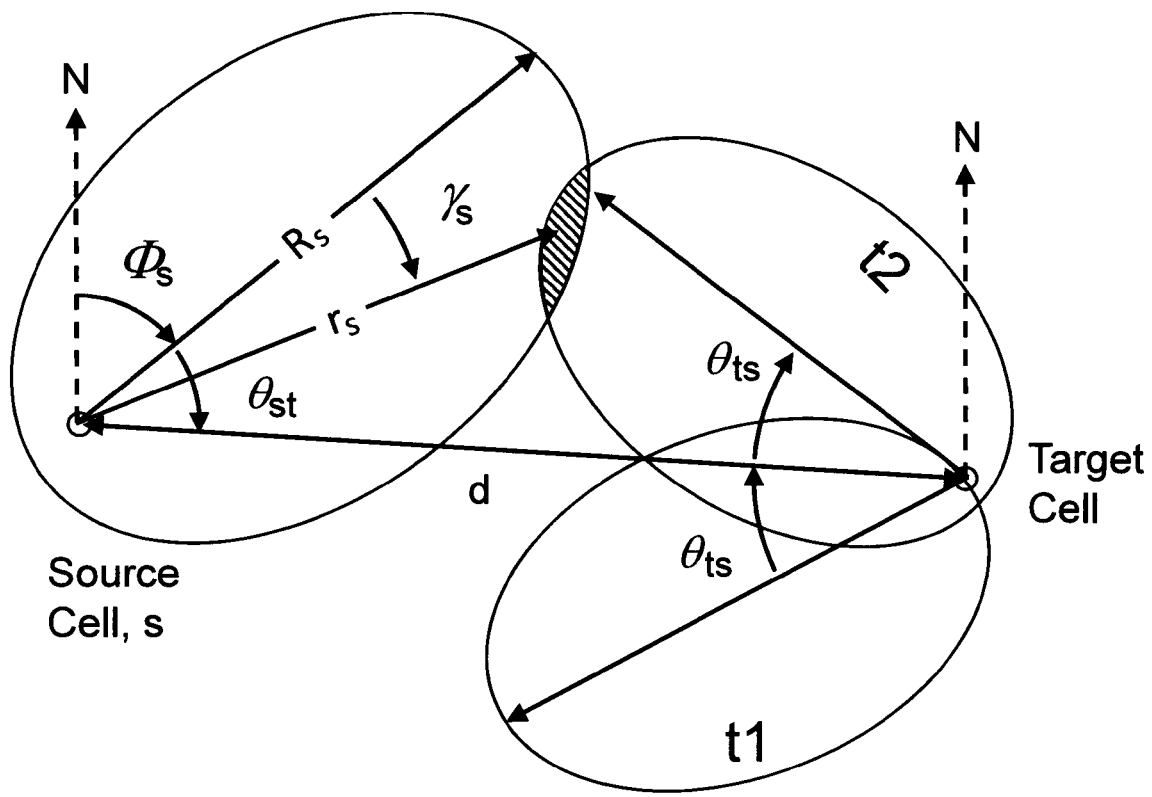
FIG. 11 is a schematic diagram illustrating relationships between neighboring cells according to exemplary embodiments of the present invention.

Cell Proximity Coupling:

According to exemplary embodiments of the present invention, the CPC indicates the "percentage" to which the geographical coverage of a specific target cell overlaps with that of the source cell. This is not necessarily symmetric given that the two cells may be of different sizes. In general terms, consider the three cells shown in FIG. 11 illustrating a coverage coupling between a source cell $s(x_s, y_s, \phi_s, \tau_s, R_s)$ and two target cells $t(x_t, y_t, \phi_t, \tau_t, R_t)$.

Here, x,y are the respective coordinates of the cells' antennas, and D are the respective azimuths. Further, τ is a heuristic beam width factor to account for how much, for a given distance r, a received signal changes as a function of the antenna's beam width. Further, R are the cell ranges, determined as the (expected) maximum coverage distance of the cells along the antenna boresight. These can easily be computed e.g. from Pathloss calculations, using the networks' planning data.

For two cells s and t to be neighbors, their coverage must surmount distance d, which is the distance of separation between the locations of the two cells. In other words, considering the orthogonal orientations of both cells, the sum of the radiation components of s and t resolved along the Line of Sight (LOS) path between the two cells must cover the distance d.

Consequently, according to exemplary embodiments of the present invention the CPC (overlapping amount information) between cell s and t is defined as

| Neighbor's Cell Id | Physical Cell Indicator | CPC | CPC CoM | Removal allowed | Handover allowed | ICIC allowed | LB allowed | qOffset | Cell individual Offset |
|---|---|---|---|---|---|---|---|---|---|
| ... | ... | ... | ... | ... | ... | ... | ... | ... | ... |
| ... | ... | ... | ... | ... | ... | ... | ... | ... | ... |

Since a cell's neighbor relationships may be requested by the operation, administration, and management (OAM) via the 3GPP SA5 North Bound Interface (Itf-N) or by another cell via the X2 interface, according to exemplary embodiments of the present invention, both the X2 & Itf-N interfaces are extended accordingly.

In detail, the extensions according to exemplary embodiments of the present invention are in the "X2 SETUP REQUEST" and "Itf-N basic configuration management integration reference point operations" and/or "bulk configuration management integration reference point operations" procedures, wherein the Neighbor-Information IE is extended by adding the CPC and CoM as illustrated in the listing below for the case of the "X2 SETUP REQUEST":

$$CPC = \frac{100 \times \min[-d + R_s \cdot cp_s \cdot cp_{sy} + R_t \cdot cp_t \cdot cp_{ty}; 2R_t; 2R_s]}{2R_s} \quad (1)$$

where, the coefficients cp and $cp_y$ respectively account for the cells radiation patterns along and orthogonal to the LOS path between the cells. Specifically, $cp_y$ ensures to account for the case where the cells only overlap off the LOS path as is the case for s and t2 in FIG. 11.

The CPC resolves the coverage ranges ($R_{s/t}$) of the cells s and t using the coupling coefficients $cp_{s/t}$. The coupling coefficients scale the ranges depending on the cells' beamwidths and the angles between the LOS path and the cells' boresight. The components from both cells are summed to determine whether or not together the cells overcome the distance d. If they do (i.e. CPC>0), then the two cells have an overlapping region and are thus neighbors. Consequently, the higher the coupling CPC, the more are the two cells neighborly to each other.

However, since the cells may be of different sizes, the degree to which they overlap will be dictated by the smaller of the two cells. Consequently, the CPC will not exceed the degree to which the smaller of the two cells overlaps either with an overlaid equi-sized cell or with the larger cell. Then to quantify the percentage of overlap, the computed value is divided by the maximum possible overlap of the source cell, which is the overlap of a perfectly overlaid cell of equivalent size to s.

According to exemplary embodiments of the present invention, the CPC is not strictly an indicator of geographical overlap, but rather a more abstract number for the level of neighborliness. Consequently, the computation showed above is an exemplary way of calculating the CPC.

As another example according to exemplary embodiments of the present invention, the CPC is calculated based on the UE measurements for those cells which are visible to UEs covered by the source cell. Therein, the overlap is modelled by the percentage of the source cell's users that could also be served by the target cell.

To achieve the desired outcome, according to exemplary embodiments, the coupling coefficients $cp_{\{s/t\}y}$ are appropriately implemented, as discussed below.

Cpc Los Coefficients:

For the following determination, it is considered for cell s in FIG. 11 that a point p is at angle θ from s's antenna boresight, i.e. with the cell's azimuths as ϕ, and the LOS path to point p making angle β relative to the geographic north, so that $\theta=\beta-\phi$. $cp_{s,t}$, i.e., the radiation component of s to point p is $$cp_{s,t} = \begin{cases} \left|\cos\left(\frac{\theta}{2}\right)\right|^\tau; & \theta = \beta - \Phi \\ \left|\cos\left(\frac{(\Phi_s - \Phi_t)}{2}\right)\right|^\tau; & p \text{ located at } x_s, y_s \end{cases} \quad (2)$$

Given the definition above, for the two cells s and t, $cp_s$ and $cp_t$ are the components with θ respectively measured from s ($\theta_{st}$) and t ($\theta_{ts}$) as shown in FIG. 11. τ was heuristically determined to be an exponentially decreasing function of the beam-width represented by the approximate values shown in the table below, illustrating an inter-dependency of the cell's bandwidths and the beamwidth factor τ.

| 3 dB Beamwidth | omni | 180° | 130° | 120° | 75° | 60° | 30° | 10° | 1° |
|---|---|---|---|---|---|---|---|---|---|
| Null-null beamwidth | — | 255° | 210° | 195° | 135° | 120° | 60° | 30° | 2° |
| T | | 1 | 2 | 2.5 | 6 | 10 | 40 | 340 | 2500 |

It is noted that the table above illustrates an example set of values of the beamwidth factor τ, which may be replaced by values arising from further insight and/or more accurate determinations thereof.

Figure 12:
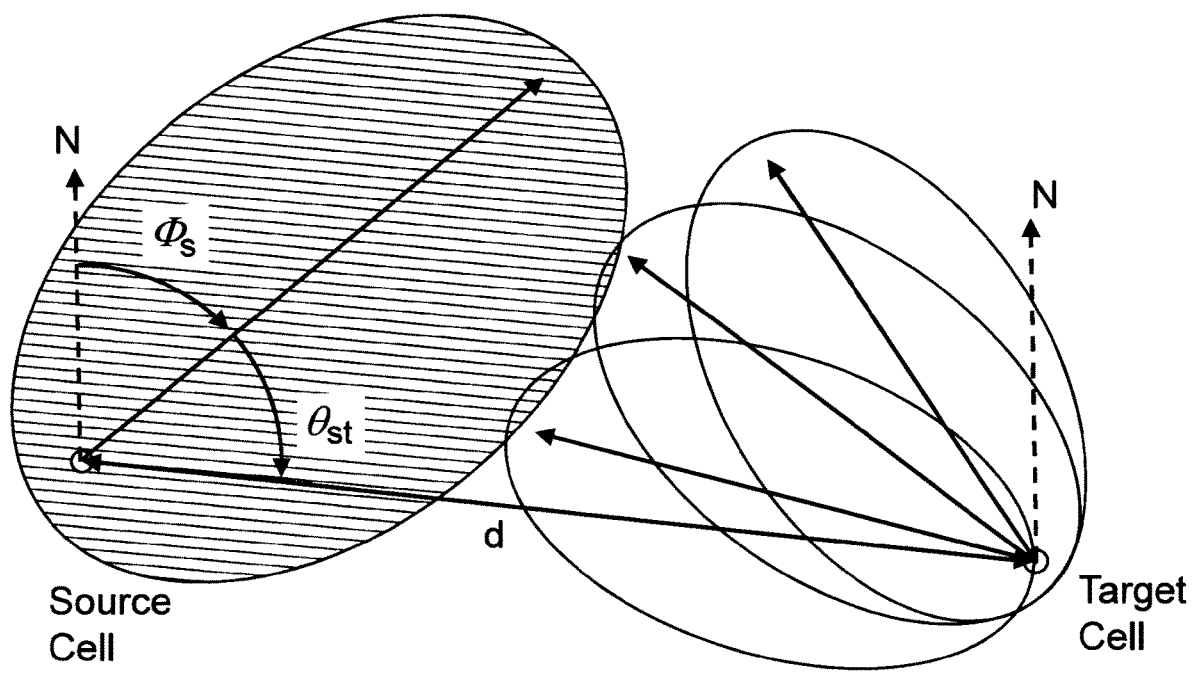
FIG. 12 is a schematic diagram illustrating relationships between neighboring cells according to exemplary embodiments of the present invention.

CPC Orthogonal Coefficients:

In the case where the two cells intersect outside the LOS path, the net effective CPC for each cell should be slightly longer than default (i.e. the case where cells overlap along the LOS path). As showed by FIG. 12 illustrating that the orthogonal coupling depends on an angle to the LOS path, the difference from the default CPC should be a function of the angle θ, i.e., $cp_{\{s/t\}y}=[1:1+\delta]$; $\delta=f(\theta)$. Consequently, according to exemplary embodiments of the present invention, the default is applied in case the coverage of the two cells does not intersect, and the default is scaled with $cp_{\{s/t\}y}>1$ otherwise. i.e.

$$cp_{\{s/t\}y} = \begin{cases} 1 + 0.2|\sin(\theta_{st}/2)|^{\tau_{\{s/t\}}}; & \text{if coverage intersects} \\ 1; & \text{otherwise} \end{cases} \quad (3)$$

The conditions for two cells to intersect outside the LOS path is found to be that $\theta_{st}+\theta_{ts}<180°$, and $\text{sgn}(\theta_{st}) \neq \text{sgn}(\theta_{ts})$.

Beam Coupling: Cells with Beam Forming:

It may be necessary in 5G that some processes are executed between a cell and a beam of a neighbor cell or between two beams of the same cell or neighbor cells. In that case the coupling needs to quantify the degree of neighborliness of a given beam to either a cell or another beam.

The CPC according to exemplary embodiments of the present invention achieves this, albeit with a different beam range.

Owing to beam forming, the effective range of a beam increases, so assuming a total transmission loss of TL(R) at the cell range R, the beam range becomes $$R_b = R^{(1+\frac{g}{TL(R)})}, \quad (4)$$

where g is the beamforming gain for a M×M beamforming array given as, $g=10 \log_{10}(M \times M)$ \quad (5)

It is noted that for ease of computation, it may be adequate to assume that transmission losses TL(R) are only due to Pathloss which for the range R is defined in 3GPP as $TL(R)=128.1+37.6*\text{Log }10(R[\text{Km}])$ \quad (6)

CPC Center of Mass (CPC CoM):

According to exemplary embodiments of the present invention, the CoM (overlapping location information) describes the center of the overlap region between the two cells as a tuple $[r_s,\gamma_s]$ of integer values $r_s$ and $\gamma_s$. As mentioned above, according to exemplary embodiments of the present invention, the CoM values are indicated as $r_s=[0,100]$ for the distance relative to the cell range and $\gamma s=[-180,180]$ for the angle.

Figure 13:
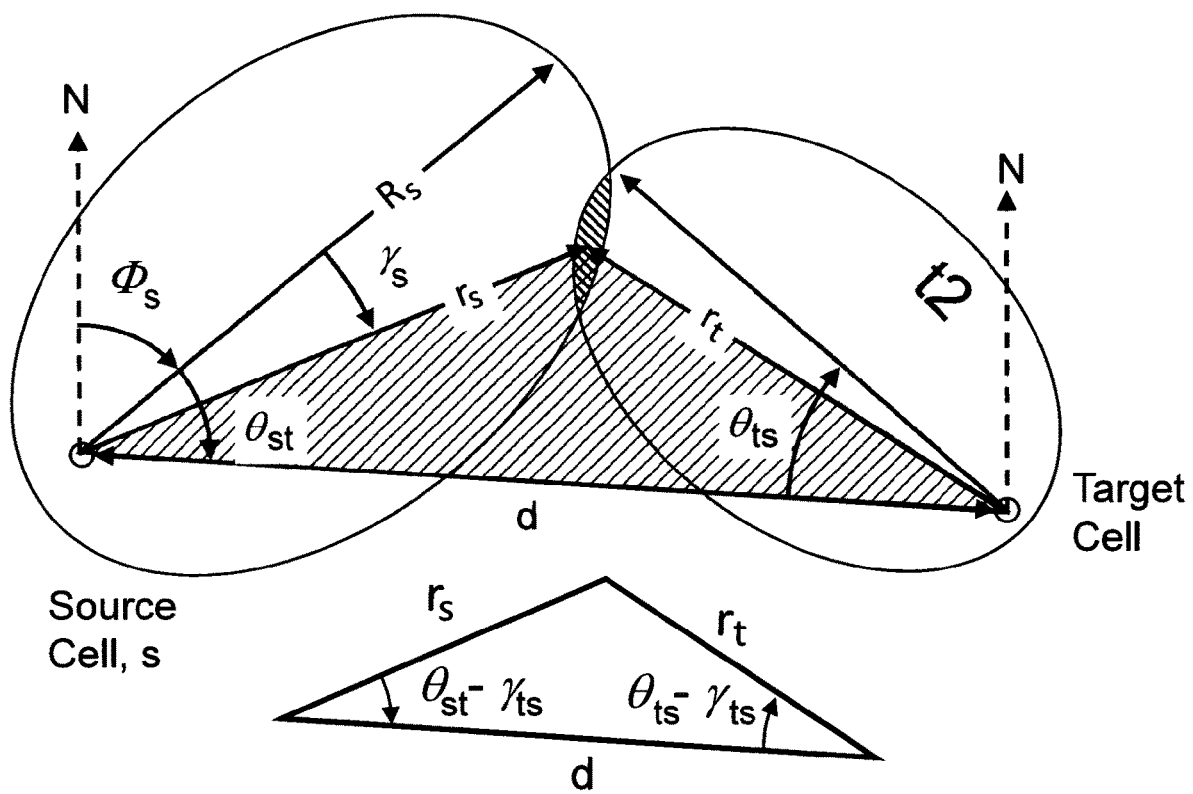
FIG. 13 is a schematic diagram illustrating relationships between neighboring cells according to exemplary embodiments of the present invention.

Non Co-Located Cells:

To compute the CoM values for co-located cells, it is assumed that the region between the CoM point and two non co-located cells forms a triangle as shown in FIG. 13 illustrating coverage coupling between a source cell and a target cell. Thereby, the cosine rule can be used to compute the angles $\gamma_s$ and $\gamma_t$ if the sides of the triangle $r_s$ and $r_t$ are known.

For the cell s, its distance of coverage towards the overlap region is computed using Equation (1) above to account for the components along and orthogonal to the LOS path as the product $R_s \cdot cp_s \cdot cp_{sy}$. Since s overlaps with t by a ratio represented by the CPC, according to exemplary embodiments of the present invention, the distance to the center of mass is approximated by $$r_s = R_s \cdot cp_s \cdot cp_{sy} - R_s \cdot \frac{CPC_s}{2} \quad (7a)$$

Similarly, the distance of cell t (cell t's antenna) to the center of mass is approximated by $$r_t = R_t \cdot cp_t \cdot cp_{ty} - R_t \cdot \frac{CPC_t}{2} \quad (7b)$$

Using the cosine rule, the angles are obtained as $$\gamma_s = \theta_{st} - \cos^{-1}\left[\frac{d^2 + r_s^2 - r_t^2}{2 \cdot d \cdot r_s}\right] \quad (8a)$$

and $$\gamma_t = \theta_{ts} - \cos^{-1}\left[\frac{d^2 + r_t^2 - r_s^2}{2 \cdot d \cdot r_t}\right] \quad (8b)$$

It is noted that the case of two non co-located cells directly pointing towards each other is a special case of the scenario presented above. Therein, $\gamma_s = \gamma_t = 0$ and $r_s$, $r_t$ reduce to $$r_s = \frac{d + R_s - R_t}{2} \text{ and } r_t = \frac{d + R_t - R_s}{2}.$$

Figure 14:
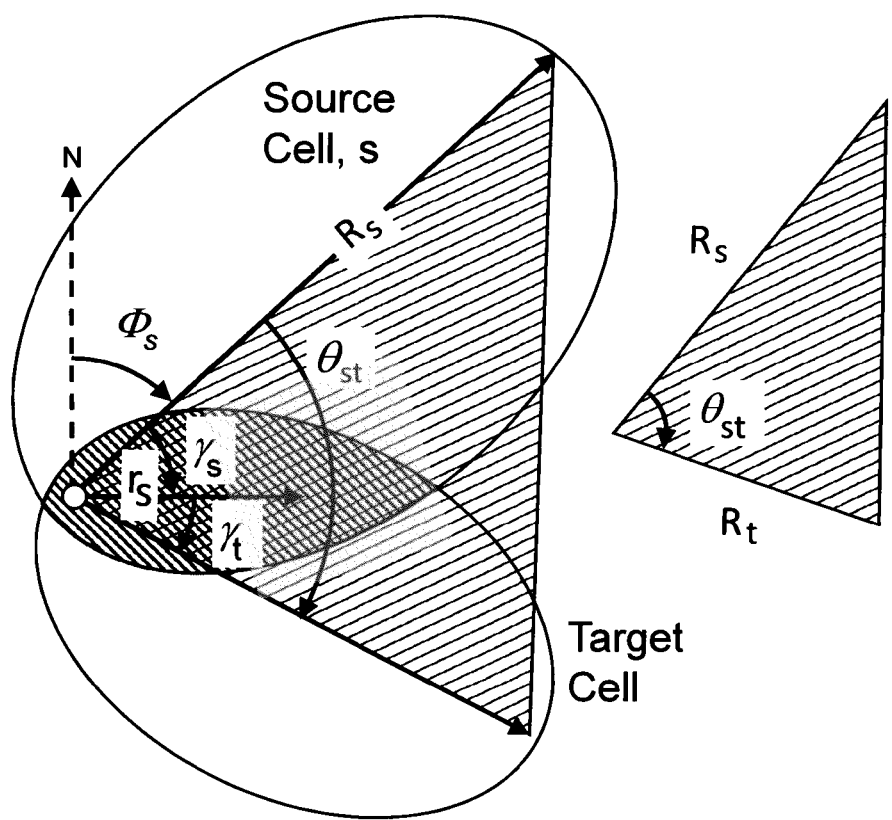
FIG. 14 is a schematic diagram illustrating relationships between neighboring cells according to exemplary embodiments of the present invention.

Co-Located Cells:

For two co-located cells as showed in FIG. 14 illustrating coverage coupling between a source cell and a target cell, the distances to the center of mass (i.e. $r_s$ and $r_t$) are equal. The angles on the other hand, are different and depend on the cells' respective ranges and beam-widths. These must however fulfil two conditions:

1. The two angles to the CoM must add up to the angle between the azimuths of the two cells, i.e.

$$\gamma_s + \gamma_t = \theta_{st} = |\phi_s - \phi_t| \quad (9)$$

2. At the middle of the overlap region, the coverage components of the two cells must be equal $$R_s \left|\cos\left(\frac{\gamma_s}{2}\right)\right|^{r_s} = R_t \left|\cos\left(\frac{\gamma_t}{2}\right)\right|^{r_t} \quad (10)$$

The pair of equation can be solved to obtain $\gamma_s$ and $\gamma_t$. Thus, according to exemplary embodiments of the present invention, the distance to the CoM is then half of any of the components along the line to the CoM $$r_s = r_t = \frac{R_s}{2}\left|\cos\left(\frac{\gamma_s}{2}\right)\right|^{r_s} = \frac{R_t}{2}\left|\cos\left(\frac{\gamma_t}{2}\right)\right|^{r_t} \quad (11)$$

It is noted here as well that the case of two co-located cells pointing in the same direction is a special case of the co-located scenario above, wherein $$\gamma_s = \gamma_t = 0 \text{ and } r_s = r_t = \min\left[\frac{R_s}{2}, \frac{R_t}{2}\right].$$

Automating the neighbor selection and NR list Optimization:

According to exemplary embodiments of the present invention, using the neighbor cells ranking as above described, the source ranks its neighbors using the Cell Proximity Couplings of the different neighbor cells. The source cells can then mark the lowest ranking neighbors as unnecessary neighbors for the process at hand, i.e. for handover purposes, they can be marked as being unavailable for handover, while for ESM they can be automatically excluded from the power saving group candidates.

Given the outcome above, the automation process reduces only to a selection of appropriate thresholds for each process. The default choice for lowest acceptable neighbor could be a CPC=0, but any small number CPC>0 can be considered as desired. This selection can also be optimized by looking at the appropriateness of the selected neighbors and adjusting the threshold as necessary.

Subsequently, a detailed example of a Dynamic Configuration of Power Saving Groups (PSG) for Energy Savings Management implementing aspects of the present invention is discussed.

Figure 15:
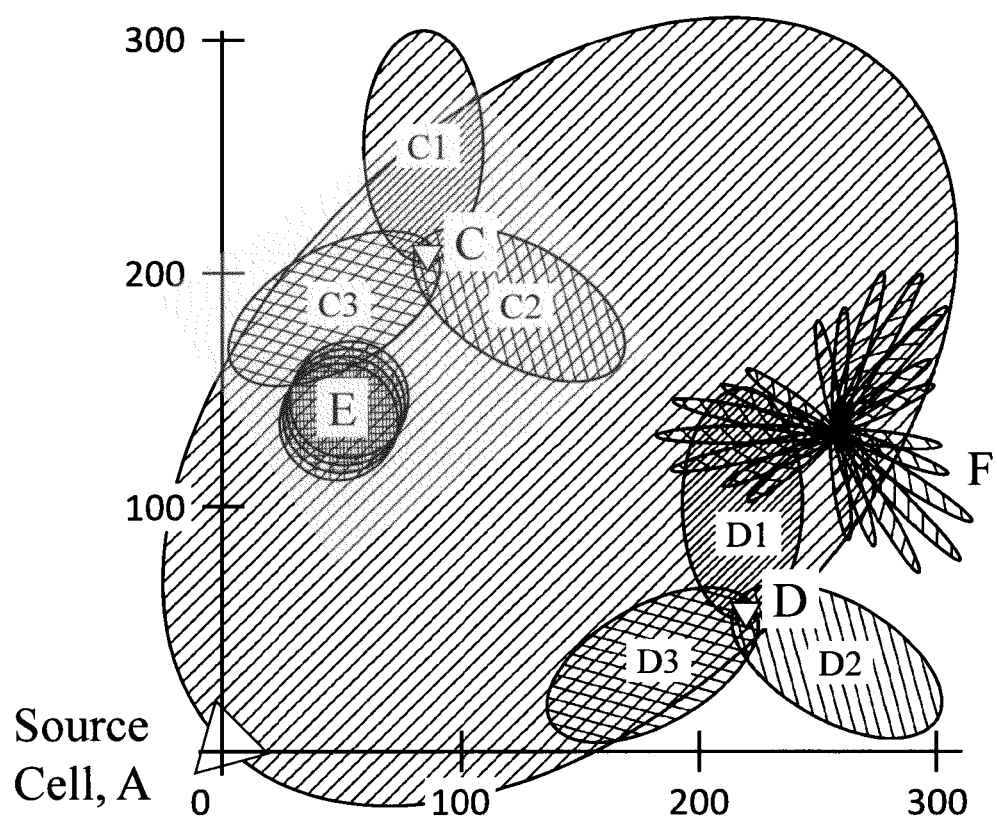
FIG. 15 is a schematic diagram illustrating relationships between neighboring cells according to exemplary embodiments of the present invention based on an exemplary scenario of multiple overlapping cells of multiple radio access technologies.

For this detailed example it is considered, as showed in FIG. 15 facilitating evaluation of neighborliness of three cells, a serving cell A[(0,0), 45°,400, 60°] with three possible neighbors sites: two LTE outdoor sites C[(100,200), {0°,120°,240°}, 100, 60°] and D[(110,0), {0°,120°,240°}, 100], 60°], a set of a 5G indoor cells E[(0,150), 0°, 50, 360°], and a 5G beamforming outdoor site F[(200,130), {0°, 120°,240°}, 75, 90°]. The relative neighborliness of the different cells and beams is computed as shown in the table below which shows CPC (neighborliness) matrix among the different cells and beams at the four sites (A, C, D, E, F) illustrated in FIG. 15. For clarity of the results, each cell in F is assumed to have only three beams in the evaluation.

| Source cell | A | C1 | C2 | C3 | D1 | D2 | D3 | E1 | E2 | E3 | F10 | F11 | F12 | F20 | F21 | F22 | F30 | F31 | F32 |
|---|---|---|---|---|---|---|---|---|---|---|---|---|---|---|---|---|---|---|---|
| A | — | 16 | 19 | 25 | 18 | 14 | 25 | 13 | 13 | 13 | 3 | 11 | 13 | 12 | 12 | 12 | 12 | 11 | 3 |
| C1 | 64 | — | 4 | 4 | — | — | — | — | — | — | — | — | — | — | — | — | — | — | — |
| C2 | 78 | 4 | — | 4 | — | — | — | — | — | — | — | — | — | 1 | 36 | — | — | — | — |
| C3 | 100 | 4 | 4 | — | — | — | — | 21 | 21 | 21 | — | — | — | — | — | — | — | — | — |
| D1 | 70 | — | — | — | — | 25 | 25 | — | — | — | 1 | 1 | 1 | 1 | 1 | 1 | 1 | 1 | 1 |
| D2 | 56 | — | — | — | 25 | — | 25 | — | — | — | — | — | — | — | — | — | — | — | — |
| D3 | 98 | — | — | — | 25 | 25 | — | — | — | — | — | — | — | — | — | — | — | — | — |
| E1 | 100 | — | — | 43 | — | — | — | — | 100 | 100 | — | — | — | — | — | — | — | — | — |
| E2 | 100 | — | — | 43 | — | — | — | 100 | — | 100 | — | — | — | — | — | — | — | — | — |
| E3 | 100 | — | — | 43 | — | — | — | 100 | 100 | — | — | — | — | — | — | — | — | — | — |
| F10 | 100 | — | — | — | 9 | — | — | — | — | — | — | 100 | 46 | 4 | 0 | 0 | 0 | 0 | 0 |

-continued

| Source cell | A | C1 | C2 | C3 | D1 | D2 | D3 | E1 | E2 | E3 | F10 | F11 | F12 | F20 | F21 | F22 | F30 | F31 | F32 |
|---|---|---|---|---|---|---|---|---|---|---|---|---|---|---|---|---|---|---|---|
| F11 | 100 | — | — | — | 3 | — | — | — | — | — | 31 | — | 90 | 25 | 2 | 0 | 0 | 0 | 0 |
| F12 | 56 | — | — | — | 1 | — | — | — | — | — | 7 | 44 | — | 74 | 16 | 1 | 0 | 0 | 0 |
| F20 | 36 | — | 1 | — | 1 | — | — | — | — | — | 0 | 8 | 49 | — | 63 | 12 | 1 | 0 | 0 |
| F21 | 31 | — | 23 | — | 1 | — | — | — | — | — | 0 | 1 | 10 | 56 | — | 56 | 10 | 1 | 0 |
| F22 | 36 | — | — | — | 1 | — | — | — | — | — | 0 | 0 | 1 | 12 | 63 | — | 49 | 8 | 0 |
| F30 | 53 | — | — | — | 1 | — | — | — | — | — | 0 | 0 | 0 | 1 | 16 | 74 | — | 44 | 7 |
| F31 | 100 | — | — | — | 3 | — | — | — | — | — | 0 | 0 | 0 | 0 | 2 | 25 | 90 | — | 31 |
| F32 | 100 | — | — | — | 9 | — | — | — | — | — | 0 | 0 | 0 | 0 | 0 | 4 | 46 | 100 | — |

The table gives a number that grades (describes) the neighborliness of each possible configuration. For the specific case of C, D, E and F versus A, it is observed that all cells are neighbors to A (CPC>0) albeit with varying degrees as represented by their CPC values with clearly distinguishable relative orders of neighborliness.

It is noted that
1. the CPC of a cell with itself is always 100 which indicates the cells' overlap with a co-located equal size sized cell with the same azimuths,
2. negative values (in this case excluded from the table) could be interpreted as the degree to which the two cells are far apart, and
3. for the described implementation, the CPC also differentiates the qualitative difference in the kind of overlap, i.e. two cell that both overlap the same way but differ in terms of directivity and the region where they overlap will have a slight but notable difference in the CPC; for example, although cells C2 and C3 are both fully covered by cell A, their overlap as seen from A is different—cell C3 which has better directivity towards A and lies within A's region of higher SINR is computed to have better coupling with A compared to C2; the same is visible between cell D1 and D3.

As mentioned above, the selection of cells to include in A's PSG simplifies, when implementing aspects of the present invention, to a selection of CPC threshold above which the respective cell is (to be) included. In the above case for example, the threshold for adding a cell y to A's PSG may be set to $CPC_{ya}>60\%$ which indicates that y will only be included if A overlaps more than 60% of y's coverage. In the above case, all C, D and E cells are included except D2. F1 may also be included since two of its three beams do significantly overlap with A.

As is derivable from the above discussion of exemplary embodiments of the present invention, the present invention provides at least the following advantages:

Aspects of the present invention enable a more expressive description of the neighbor relationships from ANR and the communication of such e.g. to DSON and CSON functions than the current concept aimed mainly for mobility cases.

The solution according to aspects of the present invention is elegant but not complex to understand. It can easily be implemented be it centrally or in a distributed form and requires only minimal signaling.

The computation according to aspects of the present invention is not complex, i.e., even if it had to be computed multiple times at the base station, it would be manageable.

Aspects of the present invention require minimal signaling—to obtain planning or deployment data, which can be downloaded from OAM whenever needed and with minimal amount of data transferred.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network element/entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 16:
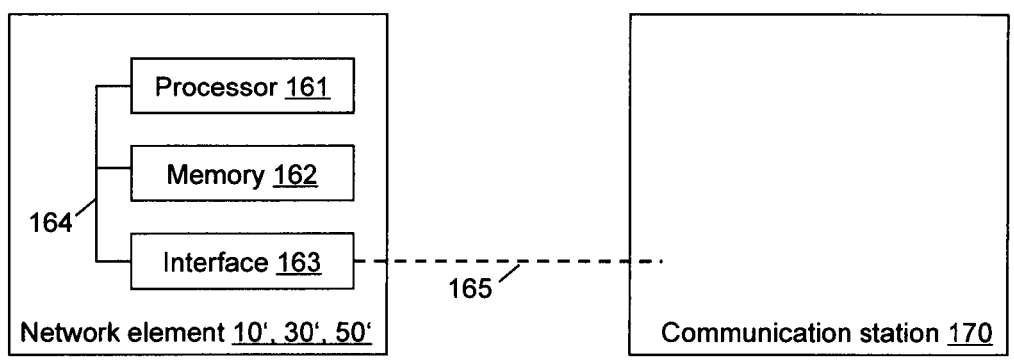
FIG. 16 is a block diagram alternatively illustrating apparatuses according to exemplary embodiments of the present invention.

In FIG. 16, an alternative illustration of apparatuses according to exemplary embodiments of the present invention is depicted. As indicated in FIG. 16, according to exemplary embodiments of the present invention, the apparatus (network element) 10'/30'/50' (corresponding to the network element 10/30/50) comprises a processor 161, a memory 162 and an interface 163, which are connected by a bus 164 or the like. The apparatuses may be connected to other apparatuses (e.g. a communication station 170) via link 165.

The processor 161 and/or the interface 163 may also include a modem or the like to facilitate communication over a (hardwire or wireless) link, respectively. The interface 163 may include a suitable transceiver coupled to one or more antennas or communication means for (hardwire or wireless) communications with the linked or connected device(s), respectively. The interface 163 is generally configured to communicate with at least one other apparatus, i.e. the interface thereof.

The memory 162 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network element 10 comprises at least one processor 161, at least one memory 162 including computer program code, and at least one interface 163 configured for communication with at least another apparatus. The processor (i.e. the at least one processor 161, with the at least one memory 162 and the computer program code) is configured to perform maintaining a table including a plurality of entries, each of said plurality of entries being assigned to a respective one of a plurality of neighboring cells and each of said plurality of entries comprises overlapping amount information in relation to a source cell and said respective one of said plurality of neighboring cells and overlapping location information in relation to said source cell and said respective one of said plurality of neighboring cells (thus the apparatus comprising corresponding means for maintaining), and to perform utilizing said table for assessment of a suitability of each of said plurality of said neighboring cells for an inter-cell capability (thus the apparatus comprising corresponding means for utilizing).

According to exemplary embodiments of the present invention, an apparatus representing the network element 30 comprises at least one processor 161, at least one memory 162 including computer program code, and at least one interface 163 configured for communication with at least another apparatus. The processor (i.e. the at least one processor 161, with the at least one memory 162 and the computer program code) is configured to perform storing overlapping amount information in relation to a source cell and a target cell of a plurality of neighboring cells and overlapping location information in relation to said source cell and said target cell of said plurality of neighboring cells (thus the apparatus comprising corresponding means for storing), and to perform transmitting said overlapping amount information and said overlapping location information to at least one of said source cell and said target cell (thus the apparatus comprising corresponding means for transmitting).

According to exemplary embodiments of the present invention, an apparatus representing the network element 50 comprises at least one processor 161, at least one memory 162 including computer program code, and at least one interface 163 configured for communication with at least another apparatus. The processor (i.e. the at least one processor 161, with the at least one memory 162 and the computer program code) is configured to perform computing overlapping amount information in relation to a source cell and a target cell of a plurality of neighboring cells and overlapping location information in relation to said source cell and said target cell of said plurality of neighboring cells (thus the apparatus comprising corresponding means for computing), and to perform storing said overlapping amount information and said overlapping location information to at least one of said source cell and said target cell (thus the apparatus comprising corresponding means for storing).

For further details regarding the operability/functionality of the individual apparatuses, reference is made to the above description in connection with any one of FIGS. 1 to 15, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for cell relations optimization. Such measures exemplarily comprise maintaining a table including a plurality of entries, each of said plurality of entries being assigned to a respective one of a plurality of neighboring cells, and each of said plurality of entries comprises overlapping amount information in relation to a source cell and said respective one of said plurality of neighboring cells and overlapping location information in relation to said source cell and said respective one of said plurality of neighboring cells, and utilizing said table for assessment of a suitability of each of said plurality of said neighboring cells for an inter-cell capability.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3$^{rd}$ Generation Partnership Project
ANR Automatic Neighbor Relations
CoM Center of Mass
CPC Cell Proximity Coupling
CSON Centralized SON
C-RAN Centralized Radio Access Network
DSON Distributed SON
ES Energy Saving
ESM Energy Saving Management
FCAPS fault, configuration, accounting, performance, security
FM Fault Management
Hetnets heterogeneous networks
ICIC Inter cell interference Coordination
KPI Key Performance Indicator
LOS Line of Sight
LTE Long Term Evolution
LTE-A Long Term Evolution Advanced
NM Network Management
NR Neighbor Relation(ship)
NRM Network Resource Model
NRT Neighbor Relations Table
OAM Operations, Administration and Management
PCI physical cell identities
PM Performance Management
PSG Power Saving Group
RAT radio access technology
SON Self-Organizing Networks
UE User Equipment

The invention claimed is:

1. A method, comprising:
   maintaining a table including a plurality of entries, each of said plurality of entries being assigned to a respective one of a plurality of neighboring cells; and
   utilizing said table for assessment of a suitability of each of said plurality of said neighboring cells for an inter-cell capability,
   wherein each of said plurality of entries comprises overlapping amount information in relation to a source cell and said respective one of said plurality of neighboring cells and overlapping location information in relation to said source cell and said respective one of said plurality of neighboring cells, and
   wherein in relation to said utilizing, said method further comprises
   deciding said suitability of each of said plurality of said neighboring cells for an inter-cell capability based on a comparison of at least one of said respective overlapping amount information and said respective overlapping location information with at least one threshold value associated with said inter-cell capability or at least one value range associated with said inter-cell capability.

2. The method according to claim 1, wherein
   in relation to said utilizing, said method further comprises
   ranking said plurality of neighboring cells based on at least one of said respective overlapping amount information and said respective overlapping location information.

3. The method according to claim 1, wherein
   in relation to said utilizing, said method further comprises
   providing said table to a distributed self-organizing networks function; or
   providing said table to a centralized self-organizing networks function.

4. The method according to claim 1, wherein
   said overlapping amount information is indicative of a portion of a geographical coverage of said source cell which is overlapped with a geographical coverage of said respective one of said plurality of neighboring cells, or
   said overlapping location information is indicative of a positional relationship between said source cell and a center of mass of a region of overlap of said source cell and said respective one of said plurality of neighboring cells.

5. The method according to claim 4, wherein
   said overlapping amount information corresponds to a value in a predetermined range of 0 to 100; or
   said overlapping location information includes a distance corresponding to a combination of a distance value in a predetermined range of 0 to 100 indicative of a distance between said source cell and said center of mass of said region of overlap of said source cell and said respective one of said plurality of neighboring cells and of an angle value in a predetermined range of −180 to +180 indicative of an angle between a reference direction of said source cell and a direction from said source cell to said center of mass of said region of overlap of said source cell and said respective one of said plurality of neighboring cells.

6. The method of claim 1, further comprising
receiving overlapping amount information in relation to said source cell and a target cell of said plurality of neighboring cells and overlapping location information in relation to said source cell and said target cell of said plurality of neighboring cells; and
updating, in said table, said entry assigned to said target cell using said received overlapping amount information and said received overlapping location information; or
adding, to said table, an entry assigned to said target cell using said received overlapping amount information and said received overlapping location information.

7. The method according to claim 6, wherein
said overlapping amount information in relation to said source cell and said target cell of said plurality of neighboring cells and said overlapping location information in relation to said source cell and said target cell of said plurality of neighboring cells are received using an X2 interface, and optionally
said overlapping amount information in relation to said source cell and said target cell of said plurality of neighboring cells and said overlapping location information in relation to said source cell and said target cell of said plurality of neighboring cells are received as respective fields in an X2 interface X2 SETUP REQUEST message.

8. The method according to claim 6, wherein
said overlapping amount information in relation to said source cell and said target cell of said plurality of neighboring cells and said overlapping location information in relation to said source cell and said target cell of said plurality of neighboring cells are received using an Itf-N interface, and optionally
said overlapping amount information in relation to said source cell and said target cell of said plurality of neighboring cells and said overlapping location information in relation to said source cell and said target cell of said plurality of neighboring cells are received as respective fields in an Itf-N basic configuration management integration reference point operations message or a bulk configuration management integration reference point operations message.

9. The method according to claim 8, wherein said respective overlapping amount information is calculated based on the equation $$CPC = \frac{100 \times \min[-d + R_s \cdot cp_s \cdot cp_{sy} + R_t \cdot cp_t \cdot cp_{ty}; 2R_t; 2R_s]}{2R_s}$$

wherein CPC is the respective overlapping amount information, d is a distance between said source cell and said respective one of said plurality of neighboring cells, $R_s$ is a maximum coverage distance of said source cell, $R_t$ is a maximum coverage distance of said respective one of said plurality of neighboring cells, $cp_s$ and $cp_t$ are line of sight coefficients related to said source cell and said respective one of said plurality of neighboring cells, and $cp_{sy}$ and $cp_{ty}$ are orthogonal coefficients related to said source cell and said respective one of said plurality of neighboring cells, or said respective overlapping location information is calculated based on the equations
for non co-located cells $$r_s = R_s \cdot cp_s \cdot cp_{sy} - R_s \cdot \frac{CPC_s}{2}$$

$$\gamma_s = \theta_{st} - \cos^{-1}\left[\frac{d^2 + r_s^2 - r_t^2}{2 \cdot d \cdot r_s}\right]$$

and for co-located cells $$r_s = \frac{R_s}{2}\left|\cos\left(\frac{\gamma_s}{2}\right)\right|^{\tau_s}$$

wherein $r_s$ is a distance value of said respective overlapping location information, $\gamma_s$ is an angle value of said respective overlapping location information, $R_s$ is a maximum coverage distance of said source cell, $cp_s$ is a line of sight coefficient related to said source cell and said respective one of said plurality of neighboring cells, $cp_{sy}$ is an orthogonal coefficient related to said source cell and said respective one of said plurality of neighboring cells, $CPC_s$ is said respective overlapping amount information, $\theta_{st}$ is an angle between a direction of said maximum coverage distance of said source cell and a direction between said source cell and said respective one of said plurality of neighboring cells, d is a distance between said source cell and said respective one of said plurality of neighboring cells, $r_t$ corresponds to a distance value of overlapping location information for said respective one of said plurality of neighboring cells, and $\tau_s$ is a heuristic beam width factor to account for how much for a given distance a received signal changes as a function of an antenna's beam width.

10. An apparatus, comprising:
at least one processor;
at least one memory including computer program code; and
at least one interface configured for communication with at least another apparatus,
the at least one processor, with the at least one memory and the computer program code, being configured to cause the apparatus to perform:
maintaining a table including a plurality of entries, each of said plurality of entries being assigned to a respective one of a plurality of neighboring cells, and
utilizing said table for assessment of a suitability of each of said plurality of said neighboring cells for an inter-cell capability,
wherein each of said plurality of entries comprises overlapping amount information in relation to a source cell and said respective one of said plurality of neighboring cells and overlapping location information in relation to said source cell and said respective one of said plurality of neighboring cells, and
wherein the at least one processor, with the at least one memory and the computer program code, are configured to cause the apparatus to further perform deciding said suitability of each of said plurality of said neighboring cells for an inter-cell capability based on a comparison of at least one of said respective overlapping amount information and said respective overlapping location information with at least one threshold value associated with said inter-cell capability or at least one value range associated with said inter-cell capability.

11. The apparatus according to claim 10, wherein
the at least one processor, with the at least one memory and the computer program code, are configured to cause the apparatus to further perform
ranking said plurality of neighboring cells based on at least one of said respective overlapping amount information and said respective overlapping location information.

12. The apparatus according to claim 10, wherein
the at least one processor, with the at least one memory and the computer program code, are configured to cause the apparatus to further perform
providing said table to a distributed self-organizing networks function, or
providing said table to a centralized self-organizing networks function.

13. The apparatus according to claim 10, wherein
said overlapping amount information is indicative of a portion of a geographical coverage of said source cell which is overlapped with a geographical coverage of said respective one of said plurality of neighboring cells, or
said overlapping location information is indicative of a positional relationship between said source cell and a center of mass of a region of overlap of said source cell and said respective one of said plurality of neighboring cells.

14. The apparatus according to claim 13, wherein
said overlapping amount information corresponds to a value in a predetermined range of 0 to 100, or
said overlapping location information includes a distance corresponding to a combination of a distance value in a predetermined range of 0 to 100 indicative of a distance between said source cell and said center of mass of said region of overlap of said source cell and said respective one of said plurality of neighboring cells and of an angle value in a predetermined range of −180 to +180 indicative of an angle between a reference direction of said source cell and a direction from said source cell to said center of mass of said region of overlap of said source cell and said respective one of said plurality of neighboring cells.

15. The apparatus of claim 10, wherein
the at least one processor, with the at least one memory and the computer program code, are configured to cause the apparatus to further perform
receiving overlapping amount information in relation to said source cell and a target cell of said plurality of neighboring cells and overlapping location information in relation to said source cell and said target cell of said plurality of neighboring cells, and
updating, in said table, said entry assigned to said target cell using said received overlapping amount information and said received overlapping location information, or
adding, to said table, an entry assigned to said target cell using said received overlapping amount information and said received overlapping location information.

16. The apparatus according to claim 15, wherein
said overlapping amount information in relation to said source cell and said target cell of said plurality of neighboring cells and said overlapping location information in relation to said source cell and said target cell of said plurality of neighboring cells are received using an X2 interface, and optionally
said overlapping amount information in relation to said source cell and said target cell of said plurality of neighboring cells and said overlapping location information in relation to said source cell and said target cell of said plurality of neighboring cells are received as respective fields in an X2 interface X2 SETUP REQUEST message.

17. The apparatus according to claim 15, wherein
said overlapping amount information in relation to said source cell and said target cell of said plurality of neighboring cells and said overlapping location information in relation to said source cell and said target cell of said plurality of neighboring cells are received using an Itf-N interface, and optionally
said overlapping amount information in relation to said source cell and said target cell of said plurality of neighboring cells and said overlapping location information in relation to said source cell and said target cell of said plurality of neighboring cells are received as respective fields in an Itf-N basic configuration management integration reference point operations message or a bulk configuration management integration reference point operations message.

18. The apparatus according to claim 10, wherein
said respective overlapping amount information is calculated based on the equation $$CPC = \frac{100 \times \min[-d + R_s \cdot cp_s \cdot cp_{sy} + R_t \cdot cp_t \cdot cp_{ty}; 2R_t; 2R_s]}{2R_s}$$

wherein CPC is the respective overlapping amount information, d is a distance between said source cell and said respective one of said plurality of neighboring cells, $R_s$ is a maximum coverage distance of said source cell, $R_t$ is a maximum coverage distance of said respective one of said plurality of neighboring cells, $cp_s$ and $cp_t$ are line of sight coefficients related to said source cell and said respective one of said plurality of neighboring cells, and $cp_{sy}$ and $cp_{ty}$ are orthogonal coefficients related to said source cell and said respective one of said plurality of neighboring cells, or
said respective overlapping location information is calculated based on the equations
for non co-located cells $$r_s = R_s \cdot cp_s \cdot cp_{sy} - R_s \cdot \frac{CPC_s}{2}$$

$$\gamma_s = \theta_{st} - \cos^{-1}\left[\frac{d^2 + r_s^2 - r_t^2}{2 \cdot d \cdot r_s}\right]$$

and for co-located cells $$r_s = \frac{R_s}{2}\left|\cos\left(\frac{\gamma_s}{2}\right)\right|^{T_s}$$

wherein $r_s$ is a distance value of said respective overlapping location information, $\gamma_s$ is an angle value of said respective overlapping location information, $R_s$ is a maximum coverage distance of said source cell, $cp_s$ is a line of sight coefficient related to said source cell and said respective one of said plurality of neighboring cells, $cp_{sy}$ is an orthogonal coefficient related to said source cell and said respective one of said plurality of neighboring cells, $CPC_s$ is said respective overlapping amount information, $\theta_{st}$ is an angle between a direction of said maximum coverage distance of said source cell and a direction between said source cell and said respective one of said plurality of neighboring cells, d is a distance between said source cell and said respective one of said plurality of neighboring cells, $r_t$ corresponds to a distance value of overlapping location information for said respective one of said plurality of neighboring cells, and $\tau_s$ is a heuristic beam width factor to account for how much for a given distance a received signal changes as a function of an antenna's beam width.

19. The apparatus according to claim 10, wherein
said inter-cell capability is one of a handover of a mobile terminal, an inter cell interference coordination, an energy savings mechanism, and a physical cell identities assignment, or
the apparatus is operable as or at a base station or access node of a cellular system.

\* \* \* \* \*